US012668507B2

(12) United States Patent
Shubat et al.

(10) Patent No.: US 12,668,507 B2
(45) Date of Patent: Jun. 30, 2026

(54) METHOD AND SYSTEM FOR WATER INTEGRITY CONTROL

(71) Applicant: SPI TECHNOLOGY LTD., Nepean (CA)

(72) Inventors: James Shubat, Nepean (CA); Els Vanbeckevoort, Nepean (CA); Ludo Feyen, Heusden-Zolder (BE)

( * ) Notice: Subject to any disclaimer, the term of this patent is extended or adjusted under 35 U.S.C. 154(b) by 426 days.

(21) Appl. No.: 18/255,676

(22) PCT Filed: Dec. 6, 2021

(86) PCT No.: PCT/CA2021/051740
§ 371 (c)(1),
(2) Date: Jun. 2, 2023

(87) PCT Pub. No.: WO2022/115969
PCT Pub. Date: Jun. 9, 2022

(65) Prior Publication Data
US 2024/0367998 A1 Nov. 7, 2024

Related U.S. Application Data

(60) Provisional application No. 63/121,317, filed on Dec. 4, 2020.

(51) Int. Cl.
| | |
|---|---|
| *C02F 1/00* | (2023.01) |
| *C02F 1/72* | (2023.01) |
| *C02F 101/30* | (2006.01) |
| *C02F 103/00* | (2006.01) |

(52) U.S. Cl.
CPC .............. *C02F 1/008* (2013.01); *C02F 1/722* (2013.01); *C02F 2101/30* (2013.01); *C02F 2103/007* (2013.01); *C02F 2209/003* (2013.01); *C02F 2209/006* (2013.01); *C02F 2209/008* (2013.01); *C02F 2209/02* (2013.01); *C02F 2209/06* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 4,036,590 | A * | 7/1977 | Helder | G01N 33/205 436/80 |
| 7,229,550 | B2 | 6/2007 | Haase | |
| 9,517,954 | B2 | 12/2016 | Konishi et al. | |
| 10,087,084 | B2 | 10/2018 | DeMyer | |
| 10,118,849 | B2 | 11/2018 | Unhoch | |
| 10,272,014 | B2 | 4/2019 | Potucek et al. | |

(Continued)

FOREIGN PATENT DOCUMENTS

WO        2019165552 A1     9/2019

*Primary Examiner* — Richard C Gurtowski

(57) ABSTRACT

A water integrity control and disinfection method and system that measures key water parameters and can diagnose water integrity instability trends that result in loss of water integrity. Relevant water parameters that are predictive of water integrity such as cell null value as measured by in-line colorimetry provide early warning and prediction of problematic trends in the water integrity so that the system can pro-actively respond appropriately and prevent, mitigate or reverse the instability trend and maintain microbiological control of the water supply.

19 Claims, 18 Drawing Sheets

(56) References Cited

U.S. PATENT DOCUMENTS

| | | | |
|---|---|---|---|
| 10,669,173 B2 | 6/2020 | Fujiwara et al. | |
| 2010/0292844 A1* | 11/2010 | Wolf | C02F 9/00 |
| | | | 700/271 |
| 2017/0313604 A1* | 11/2017 | Garibi | C02F 1/008 |
| 2020/0331772 A1 | 10/2020 | Johnson et al. | |

\* cited by examiner cATP concentration of SHP

Cell Null + Error vs. Time

Cell Null + Error vs. Time

METHOD AND SYSTEM FOR WATER INTEGRITY CONTROL

CROSS-REFERENCE TO RELATED APPLICATION

This application claims priority to U.S. provisional patent application Ser. No. 63/121,317, filed 4 Dec. 2020, and is a United States National Stage application under 35 U.S.C. 371 of PCT Application No. PCT/CA2021/051740, filed on 6 Dec. 2021, both of which are incorporated by reference herein in their entirety.

FIELD OF THE INVENTION

The present invention pertains to water integrity measurement using a continuous in-line cell null measurement and adjustment of treatment conditions based on water parameter variations to maintain water health in a water distribution system. The present invention also pertains to the maintenance and control of water disinfection using a variable disinfectant setpoint control.

BACKGROUND

Water on earth is a very complex substance with the ability to act as a solvent essential to living organisms. In fact, water is often called the "universal solvent" because it is capable of dissolving more substances than any other liquid. In nature, this means that wherever water goes, through the air, the ground, or through our bodies, it carries along with it a plethora of solubilized chemicals, as well as non-dissolved emulsified and suspended particulate. Due to its ubiquitous availability and ability to react, solubilize, and interact with most everything it comes into contact with, what we think of as water is actually highly variable in content and properties.

Water for human and agricultural use comes from freshwater sources, such as lakes, streams, ponds, underground aquafers, rivers, which can be accessed and treated to provide safe water. Drinking water is one of the fundamental requirements of any civilization, and the quality and availability of safe drinking water has improved dramatically since the introduction of disinfectants such as chlorine. However, disinfectants can be damaging to animals and plants if in too high a concentration in the water supply. In addition, the concentration of disinfectant in the water is not always a good measurement of water integrity for the purpose of evaluating safety, especially in cases where primary disinfection is carried out with an undetectable species such as by ultraviolet lamps, or when properties of the water do not support stable residual active concentrations of disinfectant in the water system.

Opportunistic pathogens in water distribution systems pose a significant risk to human health. In hot water lines or circulating hot water, for example, conditions in the water distribution system can be opportune for microbiological growth such that water already treated with primary disinfection has insufficient residual disinfectant to control pathogen growth, which increases risk of user exposure and infection. Premise plumbing in large buildings poses a unique challenge in that distribution lines can be long, and systems have a multitude of distal outlets that are generally unmonitored for microbiological growth. Purpose-built water systems such as cooling towers, heating ventilation and air conditioning (HVAC) systems, evaporative condensers, pools, spas, and other locations of stagnant water in a plumbing system can also provide favourable conditions for growth of opportunistic microorganisms if disinfection is not maintained in proper control. Risk assessment and continuous monitoring of municipal and premise water supplies is critical to ensure water safety and provide risk mitigation of opportunistic pathogens in water distribution systems.

Chlorine is a powerful disinfectant and very effective against a broad range of waterborne pathogens, particularly under conditions where there is a maintenance of active chlorine residual in the distribution system. Chlorine is commonly used as a systemic chemical disinfectant in potable water plumbing systems, with treatment of water commonly carried out at centralized municipal water treatment centres. The two chemical species formed by chlorine in water, hypochlorous acid (HOCl) and hypochlorite ion (OCl⁻), are commonly referred to as "free available" chlorine. Hypochlorous acid is a weak acid and will disassociate according to:

$$HOCl \rightarrow H^+ + OCl^-$$

In waters with pH between 6.5 and 8.5, the reaction is incomplete and both species (HOCl and OCl⁻) will be present. A relatively strong oxidizing agent, chlorine can react with a wide variety of compounds. Of particular importance in disinfection is the chlorine reaction with nitrogenous compounds such as ammonia, nitrites and amino acids. The more active disinfectant species of chlorine is hypochlorous acid (HOCl), however hypochlorous acid is unstable in water, particularly at high temperature and high pH. Another serious drawback of chlorine disinfection also includes the production of disinfectant by-products such as trihalomethanes (THMs) and haloacetic acids, many of which are known to be biotoxic. Chloramines are weaker oxidants than chlorine, resulting in fewer regulated by-products, however their use results in increased incidence of corrosion of lead and copper plumbing systems, further providing favourable growth conditions for microbiological organisms. In particular, a pH below 7.0 in the presence of chlorine creates highly corrosive water, whereas a pH above approximately 7.8 to 8.0 greatly diminishes chlorine's disinfectant efficacy.

Available corrosion control techniques can be used including pH adjustment, alkalinity adjustment, and addition of corrosion inhibitors. However, for hard, alkaline water, pH and alkalinity adjustment is not an option because excessive precipitation of calcium carbonate can occur and diminish the hydraulic capacity of the pipes. Orthophosphate can be used as a corrosion control chemical for hard, alkaline water, however stringent phosphorus discharge limits at municipal wastewater treatment and copper corrosion limit the amount of orthophosphate that can be added to water.

Stabilized hydrogen peroxide (H₂O₂) with continuous and in-line dosing and monitoring can also provide efficient disinfection and control of opportunistic pathogenic microorganisms in a water supply system. In stabilized hydrogen peroxide (SHP), the combined formulation of H₂O₂ and silver and other metals has been found to be some 100 times more powerful as a disinfectant than hydrogen peroxide alone and can provide a long lasting effective disinfectant residual which is less sensitive to pH and temperature than chlorine disinfection. In drinking water regulations, acceptable concentration thresholds for hydrogen peroxide are in the order of under 10 ppm. For example, in Ontario, Canada, operating concentrations for peroxide in drinking water are between 2-8 ppm. Control of microbiological growth is more challenging in hot water systems since the elevated temperatures can provide more ideal growth environments to opportunistic pathogens, however studies have shown that SHP disinfection power increases as water temperature increases, which contributes to its effective control of micro-biological growth especially in hot water distribution systems. Compared to conventional disinfection regime using chlorine and chlorine based products, stabilized hydrogen peroxide is biodegradable and does not produce harmful disinfection by-products including trihalomethanes (THMs) and haloacetic acids (HAAs), whose long term exposure are strongly correlated to increase in some cancers.

There are various methods of monitoring and controlling microbiological growth in a water system. In one example, U.S. Pat. No. 10,272,014 to Potucek et al. describes a system and method for providing network connectivity and remote monitoring, optimization, and control of pool and spa equipment by monitoring an operational parameter of a pool or spa device over a network connection and controlling the pump to operate at the setpoint determined by the processor of the pump, where operational parameters include skimmer speed/flow, number of skimmers, and heater speed/flow.

In another example of water system monitoring and control, U.S. Pat. No. 10,669,173 to Fujiwara et al. describes a ballast water treatment device and method in which a storage unit stores a relationship between an absorbance of raw water for a ballast and a dissolved organic carbon concentration thereof and another relationship between the dissolved concentration and a residual oxidant concentration required after a predetermined time from an oxidant supply, to kill organisms and to suppress their regrowth in the ballast. A calculation unit derives the required residual oxidant concentration corresponding to the absorbance measured by a meter by referring to the relationships and calculates a target oxidant supply amount using the required residual oxidant concentration. For the target, a control unit controls an oxidant supply device.

Statistical process control (SPC) is a method of quality control which employs statistical methods to monitor and control a process. This helps to ensure that the process operates efficiently, producing more specification-conforming products or conditions with less waste. SPC can be applied to any process where the conforming product (product meeting specifications) output can be measured and has been used in water treatment to record flow, raw water quality, chemical feed, turbidity and finished water quality data. The variability of the chemical and physical properties of different water sources, however, means that every water supply will have different requirements and water parameter setpoints to ensure water integrity and safety for use, making the use of SPC in water treatment extremely complex. There remains a need for an effective, efficient, safe, and healthy control and disinfection system that can measure water parameters, diagnose instability trends that result in loss of water integrity, and treat the water in a distribution system to provide continuous and safe water.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an effective, efficient, safe, and healthy water control and disinfection method and system that can measure water parameters, diagnose instability trends that result in loss of water integrity, and treat the water in a distribution system to provide continuous and safe water.

In an aspect there is provided a method for controlling microbial load in a water system, the method comprising: monitoring an in-line water parameter at a water parameter sensor; measuring residual disinfectant concentration in the water system over time by an in-line disinfectant concentration measurement system; analysing data from the water parameter sensor and the disinfectant concentration over time to detect an instability trend; adjusting a disinfection setpoint based on the detected instability trend; and injecting disinfectant into the water system to maintain the water system at the disinfection setpoint to control the microbial load in the water system and remediate the instability trend.

In another aspect there is provided method for continuously predicting water instability and mitigating loss of water integrity in a water system, the method comprising: providing a disinfectant pump comprising a processor for controlling the pump to maintain a disinfection setpoint, the disinfectant pump connected to a chemical disinfectant supply to inject chemical disinfectant into the water system; diverting a water sample from the water system to an in-line colorimeter; at the colorimeter, measuring a cell null value in the water sample periodically over time, the cell null value being a measurement of light transmittance through the water sample in a measurement cell in the absence of added reagent; in a processor, analysing the measured cell null values over time from the colorimeter using a time window analysis and feature extraction to detect an instability trend in the cell null value over time, the instability trend in the cell null value over time predictive of a future water instability event; and when an instability trend in the cell null value over time is detected, adjusting a water parameter to mitigate a loss of water integrity in the water system.

In an embodiment, the feature extraction of the cell null value in the time window analysis comprises one or more of standard deviation, mean squared error, fast Fourier transform coefficient, mean, median, maximum, minimum, area under the curve, number of peaks in a time period, and trending increase or decrease over time.

In another embodiment, adjusting the water parameter comprises one or more of raising the disinfection setpoint, adjusting pH, increasing filtration, increasing UV treatment, increasing ozone treatment, and addition of filtration promotion chemicals.

In another embodiment, the colorimeter measures the cell null value of the water sample between every 90 seconds to every 5 minutes.

In another embodiment, the method further comprises collecting additional water parameter data on one or more water parameters continuously over time, and analysing the additional water parameter data collected using time window analysis and feature extraction to detect instability trends in the water system over time.

In another embodiment, the additional water parameter data comprises disinfectant demand vs pump output, pH, hardness, alkalinity, electrical conductivity, ultraviolet absorption, oxidation reduction potential, color, secondary disinfectant concentration, dissolved oxygen, water level, water temperature, temperature differential between two or more locations, water flow speed, and cATP concentration.

In another embodiment, the method further comprises using the additional water parameter data in a machine learning multi-parameter model to detect anomalies in the water system that fall outside of normal stable operating parameter clusters in the multi-parameter model.

In another embodiment, cell null is measured on a scale of 0 to 1024 colorimetric transmittance units.

In another embodiment, the method further comprises measuring an instability trend in disinfectant concentration over time comprising one or more of a change in fluctuation period, average peak to peak distance over a set time period, area under the curve (AUC) calculation relative to the disinfection setpoint, range of measured disinfectant concentration, and overall trend in average concentration.

In another embodiment, the method further comprises raising an alert when an instability trend in the cell null value over time is detected.

In another embodiment, the method further comprises, when the cell null value over time indicates a stable water system, decreasing the disinfection setpoint.

In another embodiment, the water system is a potable water system, agricultural water system, horticultural water system, aquaculture system, and recreational water system.

In another embodiment, the water parameter is one or more of disinfectant demand vs pump output, colorimeter cell null value, pH, hardness, alkalinity, electrical conductivity (EC), turbidity, ultraviolet (UV) absorption, oxidation reduction potential, colour, secondary disinfectant concentration, cATP, dissolved oxygen, water level, water temperature, temperature differential between two or more locations, flow speed, and pump volume.

In another embodiment, the water parameter sensor measures the water quality parameter at a water intake to the water system.

In another embodiment, the instability trend comprises a fluctuation in greater than +/−10% of the water parameter.

In another embodiment, the instability trend is a rapid spike, rapid drop, or degradation in the water quality parameter over time.

In another embodiment, the in-line disinfectant measurement system is a colorimetric measurement system and wherein the trend indicating loss of water integrity comprises analysing the cell null value of the colorimetric measurement system.

In another embodiment, the method further comprises detecting more than one instability trend indicating loss of water integrity.

In another embodiment, the method further comprises communicating the data from the water parameter sensor and the disinfectant concentration data with a network communication subsystem.

In another aspect there is provided a system for controlling water integrity in a water system, the method comprising: an water parameter sensor to measure a water quality parameter; a water quality database for receiving and storing water quality parameter data; a water analysis engine comprising a processor for analysis of the water quality parameter data and detection of an instability trend in the water quality parameter indicating loss of water integrity; a prescriptive analytics engine for providing a prescriptive remedy for reversing the instability trend; and a disinfectant pump device for injecting chemical disinfectant in the water system.

In another aspect there is provided a system for controlling water integrity in a water system, the system comprising: a disinfectant pump comprising a processor for controlling the pump to maintain a disinfection setpoint, the disinfectant pump connected to a chemical disinfectant supply to inject chemical disinfectant into the water system; a water quality database for receiving and storing water quality parameter data from the water system over time; an in-line colorimeter receiving a water sample from the water system and measuring a cell null value in the water sample periodically over time, the cell null value being a measurement of light transmittance through the water sample in a measurement cell; a processor for analysing the measured cell null values over time from the colorimeter using a time window analysis and feature extraction to detect an instability trend in the cell null value over time and water quality parameter data stored in the water quality database, the instability trend in the cell null value over time predictive of a future water instability event and providing a prescriptive remedy based on the instability trend and water quality parameter data for reversing the instability trend comprising adjusting a water parameter to mitigate the loss of water integrity event.

In an embodiment, the processor analyses the feature extraction of the cell null value along one or more of standard deviation, mean squared error, fast Fourier transform coefficient, mean, median, maximum, minimum, area under the curve, number of peaks in a time period, and trending increase or decrease over time.

In another embodiment, the colorimeter measures the cell null value of the water sample between every 90 seconds to every 5 minutes.

In another embodiment, the prescriptive remedy comprises one or more of raising the disinfection setpoint, adjusting pH, increasing filtration, increasing UV treatment, increasing ozone treatment, and addition of filtration promotion chemicals.

In another embodiment, the additional water parameter data in the water quality database comprises disinfectant demand vs pump output, pH, hardness, alkalinity, electrical conductivity, ultraviolet absorption, oxidation reduction potential, color, secondary disinfectant concentration, dissolved oxygen, water level, water temperature, temperature differential between two or more locations, water flow speed, and cATP concentration.

In another embodiment, the processor uses the additional water parameter data in a machine learning multi-parameter model to detect anomalies in the water system that fall outside of normal stable operating parameter clusters in the multi-parameter model.

In another embodiment, cell null is measured on a scale of 0 to 1024 colorimetric transmittance units.

In another embodiment, the water system is a potable water system, agricultural water system, horticultural water system, aquaculture system, and recreational water system.

In another embodiment, the system further comprises an alarm to provide an early warning alert to the instability trend indicating future loss of water integrity.

In another embodiment, the water quality database comprises water quality parameter data from a plurality of other water systems, and wherein the processor analyses the cell null value over time in the water system and compares it with water quality parameters from at least one of the plurality of other water systems.

In another embodiment, the system further comprises, when the cell null value over time and water parameter data indicates a stable water system, decreasing the disinfection setpoint.

In another embodiment, the processor performs one or more of statistical process control analysis, principal component analysis, and multi-parameter machine learning.

In an embodiment, the system further comprises a network communication subsystem for providing communication between the processor and the Internet.

In another aspect there is provided a method for controlling water quality in a water system, the method comprising: monitoring an in-line water parameter at a water parameter sensor; analysing data from the water parameter sensor and the disinfectant concentration over time to detect an insta- bility trend; adjusting treatment of the water based on the detected instability trend; and remeasuring the in-line water parameter to confirm remediation of the instability trend and increase in water quality.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
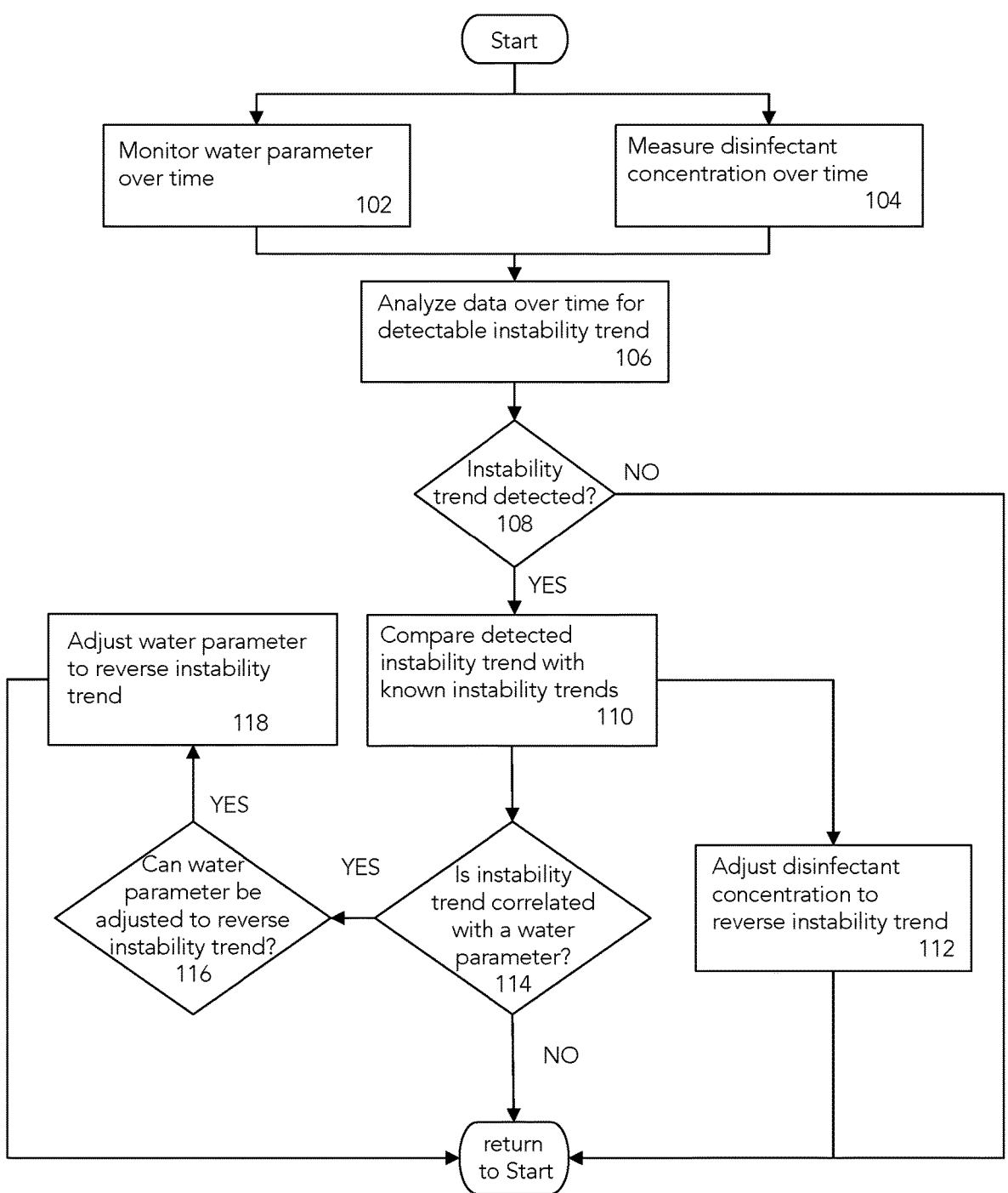
FIG. 1 is a flowchart showing an embodiment of the present invention.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appro- priate.

As used herein, the terms "connect" and "connected" refer to any direct or indirect physical association between ele- ments or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

The term "stabilized hydrogen peroxide" (SHP) as used herein refers to a solution of hydrogen peroxide in water comprising a stabilizer. SHP remains stable longer in highly diluted form and retains residual levels of active peroxide at low concentrations in many different kinds of water matrixes while enabling a targeted and controlled reaction and oxi- dation of organic material and target organisms. Unlike conventional hydrogen peroxide, the reaction of stabilized hydrogen peroxide is controlled and degradation more gradual, enabling much enhanced effectiveness against tar- get micro-organisms and protection of water or wet surface integrity, in cold and warm water conditions at a wide pH range. A variety of stabilizers can be used, such as, for example, low concentrations of metal ions such as copper or silver. One preferable stabilizer is silver ions or silver colloid. in minute concentrations used for water disinfection, an example of which is HUWA-SAN™ manufactured by Roam Technology NV of Belgium which contains 0.013- 0.017% ionic silver or Endosan™ manufactured by Endo- Enterprises, UK which contains 0.008-0.013% of ionic silver. Depending on the solution, the silver (or other sta- bilizer) prevents the hydrogen peroxide from oxidizing too quickly when it contacts water, thereby allowing the solution to mix with the water before binding to and disinfecting undesirable microorganisms and chemicals. Preferable sta- bilized hydrogen peroxide solutions are stabilized by silver ions or silver colloid, also known as oligodynamic silver, in minute concentrations. Drinking water disinfection using hydrogen peroxide and silver has been approved by juris- dictions worldwide include the United States Environmental Protection Agency (USEPA), by the Drinking Water Inspec- torate (DWI) in the United Kingdom, by the Ontario Min- istry of the Environment, and by health authorities in Aus- tralia, among others, with acceptable concentration thresholds for hydrogen peroxide on the order of under about 10 ppm. For example, in Ontario, Canada, operating concentrations for drinking water are between 2-8 ppm. Hydrogen peroxide stabilized with metal ions such as silver has particularly been found to be effective in the secondary disinfection of water in premise plumbing systems. Stabi- lized hydrogen peroxide is also stable in hot water and able to maintain a residual peroxide concentration in hot water to prevent possible re-contamination of water. The presence of the ionic silver in particular has been shown to enhance interactions of stabilized hydrogen peroxide with the bacterial cell surface, and the silver in silver-stabilized hydrogen peroxide may facilitate this association through electrostatic interactions at the cell surface. (Martin et al., Antibacterial Properties and Mechanism of Activity of a Novel Silver-Stabilized Hydrogen Peroxide, PLOS ONE, Jul. 8, 2015, 10(7) The long term efficacy of stabilized hydrogen peroxide disinfectant is attributable in part to the bacteriostatic effect of the small amounts of silver which deposit on the walls of the piping system or tanks, and coat sediments and biofilms. It is hypothesized that the positive metal ions bond to the negative bacterial cell walls sites, disrupting membrane structure which leads to bacterial cellular death by $H_2O_2$ penetration. The combined stabilized hydrogen peroxide formulation of $H_2O_2$ and silver and select other metals has been found to be some 100 times more powerful as a disinfectant than hydrogen peroxide alone and can provide a long lasting effective disinfectant residual of many days and weeks. Two tests reported in hospitals in Israel (Shuval et al., An innovative method for the control of *legionella* infections in the hospital hot water systems with a stabilized hydrogen peroxide-silver formulation, International Journal of Infection Control, April 2009, Vol. 5, Issue 1) and Italy (Casini, et al., Application of hydrogen peroxide as an innovative method of treatment for *Legionella* control in a hospital water network, Pathogens, 2017, Vol. 6, Issue 15, pp. 1-12, doi: 10.3390) demonstrate that stabilized hydrogen peroxide can be used effectively to control *Legionella pneumophila* in hospital hot water systems. In one study of a municipal water supply system, stabilized hydrogen peroxide was able to suppress microbial activity within the distribution system at a level comparable to what was achieved with chlorine even when the microbial activity within the raw water during the SHP monitoring had doubled from the time of monitoring when chlorine was being used. This data suggests that SHP can provide microbial suppression at least equivalent to sodium hypochlorite. The proven disinfection effectiveness of stabilized hydrogen peroxide based chemical disinfectants has been extended to hot water systems where it has been found that unlike chlorine which is inactive at high temperatures, stabilized hydrogen peroxide retains significant and safe residual concentration levels during and after heating.

The term "premise plumbing" as used herein refers to potable water plumbing systems in buildings of any size. In particular, premise plumbing includes large buildings that contain closed loop or circulating water systems, and particularly closed loop or circulating hot water systems. Types of buildings with premise plumbing or closed loop or circulating hot water systems can include but are not limited to: hotels, hospitals, schools, apartment buildings, healthcare offices and buildings, office buildings, libraries, community centres, single family houses, and the like.

As used herein, the term "water integrity" is used to refer to the quality of water in a water system, and is used primarily herein with respect to disinfection control of the microbial load in the water system. In water systems with high integrity the microbial load will be low and manageable with disinfection treatment. Water systems with low integrity have been seen to have wider fluctuations in microbial load, and growth can be unpredictable and result in water with higher than acceptable microbial load.

As used herein, the term "in-line" as it relates to measuring a characteristic of water in a water system, refers to an automated method for measuring a water parameter at a specific location in the water system at a specific moment in time. In-line measurements measure the water parameter of water as it flows in a main conduit of the water system and can also measure a portion of the water flowing through a system. Various water parameter sensors are suited to in-line measurement, such as, for example, temperature sensors, flow sensors, pH sensors, and colorimetry devices. In some in-line water parameter sensors a detection reagent is added to the water such as colorimetric disinfectant residual and cATP measurement devices.

As used herein, the term "microbial load" refers to the number, mass, or concentration of microbiological organisms in a water system. Increases in microbial load in a water system can occur for a number of reasons, and have been found to occur during heavy rainfall, snowmelt, flooding, rising groundwater events, higher temperature weather, and runoff events. During these events water turbidity, pH, and nitrate values can differ significantly from the values obtained for regular samples, and bacteriological presence in the water can increase considerably during extreme runoff events. Microbial load is usually measured in colony forming units per mL (cfu/mL). It is understood that not all microbiological organisms measured as a part of the microbial load are pathogenic and that some bacteria are probiotic or beneficial microbes, however higher microbial load is generally used as a measure of all microbial growth, where high microbial growth is accepted to be detrimental to a safe water supply. If large numbers of non-pathogenic coliforms, for example, are found in water, there is a high probability that other pathogenic bacteria or organisms, such as Giardia and *Cryptosporidium*, may be present. Microbial load can be tested in a variety of ways, including but not limited to polymerase chain reaction (PCR), plated culture testing, and cATP measurement.

The term "chemical disinfectant" refers to any chemical additive to the water system that can reduce the microbial load in the water system. Chemical disinfectants include, for example, chlorine-based disinfectants, peroxide-based disinfectants, and peracetic acid As used herein, the term "disinfection demand" refers to the amount of disinfectant required in the water system to maintain a healthy water supply with low microbial load. Disinfection demand can be measured in amount of disinfectant required over time, or can be understood by the disinfection setpoint, which is the concentration of disinfectant required by the system to maintain water integrity as calculated by the presently described system.

Herein is described a method and system for effective, efficient, safe, and healthy water integrity control and disinfection in a water system. The present method and system measures key water parameters and can diagnose water integrity instability trends that result in loss of water integrity, in particular the cell null value obtained from a continuous monitoring in-line colorimeter. The cell null value is a colorimetric measurement of the amount or percentage of light transmittance through a water sample in a colorimetric measurement cell based on a 100% transmittance standard for a pure water sample with no color, dissolved organics, metals, or suspended particulate. A decrease of light transmittance through the cell, or a decrease in cell null, can be caused by, for example, increased microbial load, increased organic content in the water, and increased particulate in the water, all of which contribute to a lower water quality. In particular, a decrease in cell null value has been found to be indicative of increased microbial load in the water system, and predicting trends of decreasing cell null value in a continuously monitored water system can provide advance warning of an adverse microbial growth event. This advanced warning enables the water system to adjust a disinfectant threshold to mitigate or avoid any future adverse events and maintain water integrity in the water system and pro-active and preventative treatment of the water in the water distribution system before loss of water integrity occurs, stabilizing the water to provide continuous and safe water in the system.

In the present system, water parameters are measured in a continuous and ongoing basis to provide in-line measurements. A wide variety of water parameters can be measured, including but not limited to disinfectant demand vs pump output, colorimeter cell null value, pH, hardness, alkalinity, electrical conductivity (EC), turbidity, ultraviolet (UV) absorption, oxidation reduction potential, colour, secondary disinfectant concentration, cATP concentration, dissolved oxygen, water level, water temperature, temperature differential between two or more locations, flow speed, and pump volume. In an in-line colorimetry system, measurements should be taken regularly and periodically, for example at least every 5 minutes and preferably at least every 2 minutes to produce sufficient trackable data to enable cell null trend analysis in the water system. The term 'continuous' as used herein refers to regular and periodic measurements of water parameters, where measurements are taken at least every 2-5 minutes to provide a real-time data trace of the measurement and fluctuation of each water parameter. Measurements for each water parameter are taken using appropriate digital sensors and the data is sent to a processor and computer for analysis and storage. As with any complex trend analysis system, the more data collected on systems with varying water parameters, the better the model can be at predicting future adverse events. Combining data on the water parameters under varying operation conditions, including in different industries, geographical locations, and input water quality, can provide even more attuned systems and algorithms for predicting adverse water events before they occur.

The present method and system uses statistical process control and machine learning to analyze relevant water parameters that affect water integrity to provide early warning of problematic trends in the water integrity so that the system can respond appropriately and mitigate or reverse the instability trend and maintain microbiological control of the water supply. Preferably the problematic trend is observed in advance of a loss in water integrity and the system can be automatically adjusted to treat the problem and put the water system back into a high integrity state and significant work has been done to correlate water parameters to provide a prediction of future adverse events. Water systems in which the present method and system can be used include but are not limited to potable water systems, including municipal drinking water treatment plants, campgrounds, horticultural farms (fruits and vegetable), animal husbandry farms (farms with animals that are raised for meat, fibre, milk, eggs, or other products), food processing facilities, abattoirs, premise plumbing facilities, industrial and commercial buildings, public and private swimming pools and households.

When used as a disinfectant for water, chlorine must be tracked carefully to ensure maintenance of water integrity. Free available chlorine is the concentration of chlorine available (not-bound) in the water system which is available for disinfection. Total chlorine is a combination of the free available chlorine and bound chlorine, which includes mono-, di-, and tri-chloramines. Free active chlorine is a calculated value between the free available chlorine and pH. The pH of the water has an effect of the amount of free active chlorine in the system, and the free active chlorine can be calculated and refers to the amount of chlorine available for activity to disinfect harmful microorganisms in the water. Since there are a variety of chemical forms that the chlorine can take in the water system, the ratio of free active chlorine to total chlorine depends on the water parameters, and a shift in water parameters can have very serious effects on the reactivity of chlorine for disinfection. The presence of a free active chlorine residual is an indicator of adequate disinfection, however the availability of active chlorine for disinfection depends on contact time, water temperature, concentrations of ammonia and chlorine, and pH. In an example, a rise in water temperature or pH results in less free active chlorine in the water system. Accordingly, measurement of water parameter trends including cell null by an in-line colorimeter on a continuous basis can predict degradation of free active chlorine in the water system, which leads to loss of water integrity in the form of less disinfection and rise in microbiological contamination. Further, the interplay of different water parameters can contribute to loss of integrity, and knowing how each affects the others can assist in predicting loss of water integrity before it happens.

A smart disinfection method and system as presently described supports a more targeted approach to maintaining water integrity, balancing the need for disinfection with supporting a more beneficial microbiome and overall resilience of the water system to ever-changing water parameters and properties. Multivariable statistical process control can also be used to detect multiple water parameters for projection of future events of loss of water integrity based on the current treatment conditions so that treatment can be changed proactively to avoid the degradation of water integrity.

Adenosine triphosphate (ATP) is a substance which is the energy source for the living cells found in every organism and is used by living cells as a co-enzyme or unit of chemical energy. Cellular ATP (cATP) in particular represents the ATP generated by living microorganisms suspended within a liquid and when measured in a water system is directly related to the proliferation of microbial and planktonic populations in the water system. Detection of cATP concentrations indicates the presence and extent of the biological community in a sampled water source and can be used to identify water that has been in contact with biofilms and could potentially be harboring harmful pathogens. Concentration of cATP also correlates with other microbial tests (e.g. heterotrophic plate counts) and therefore can be used as a proxy for estimating the microbial loading in a water system.

The presently described method and system can be used to create a digital Water Health Index (WHI) as a functional water intelligence and management tool that captures the applied water parameters and disinfection strategy to replace conventional treatment with a healthy water system. A WHI database, also referred to as a water quality database, can capture, record and map key performance indicators (KPIs) and risk indicators in a water treatment process and flow and enable access to accurate and precise real-time and/or rapid process monitoring and advanced analytics at a water analysis engine through field systems data capture. The WHI can also provide KPI tracking and report card benchmarking for a plurality of KPIs at a time and enables an automated feedback loop via a predictive analytics engine to predict, prevent, and pro-actively mitigate disease pressure, adverse events, and water quality instability trends through the water supply. This can reduce chemical (disinfectant chemicals/pesticides/other) use by at least 10% and up to 50% and reduce ancillary operational expenses, where properly monitored or known, by at least 5%.

FIG. 1 is a flowchart showing an embodiment of the present invention with disinfectant concentration as the proxy for water quality and integrity. In a water distribution system water, continuous water parameter and disinfectant residual concentration monitoring provides ongoing data over time that can be used to detect adverse trends. In particular, detection of fluctuation of certain water parameters such as cell null value and disinfectant concentration over time provides an indication of whether the water in the distribution system may be susceptible to a loss of control event. Loss of control events occur when the disinfectant residual concentration is not at a sufficiently high level to disinfect the water in the event of a contamination or microbial growth bloom, and the potential loss of control event can be detected in advance of the loss of control event by detecting abnormal indicators which can be observed as data patterns in the water parameter measurement.

In the system depicted in FIG. 1 both a disinfectant concentration and an additional water parameter is measured, and the data is used to detect an instability trend indicative of a future loss of control event in the water distribution system. To maintain water integrity, the system continuously monitors at least one water parameter over time 102 as well as disinfectant concentration over time 104 to obtain a time course of the water parameter and the disinfectant concentration. The disinfectant concentration over time is then analyzed to see if an instability trend can be detected 106. If an instability trend is detected 108 then the detected instability trend is compared in a water analysis engine with known instability trends 110 from a water parameter database to diagnose the trend. The instability trends can be parameter-specific, or can be a complex multi-parameter algorithm with error analysis to provide an indication of whether the set of water parameters measured is inside or outside of a normal control profile for the set of water parameters. Various trends in each water parameter can be measured and analyzed in a given time period, including but not limited to standard deviation, mean squared error or mean squared deviation, fast Fourier transform coefficient, mean, median, maximum, minimum, number of peaks in a time period, peak to peak distance over a set time period, area under the curve (AUC), as well as increase or decrease in each over time. The water analysis engine can also provide additional data such as the severity of the trend, a prediction of time to a loss of control event if no remedial action is taken, a diagnosis of the reason of the instability trend, and one or more remedial action that can be taken to mitigate or reverse the instability trend.

The simplest solution to prevent a loss of control event is to adjust the disinfectant concentration in the water distribution system to reverse the instability trend 112 by pumping additional disinfectant into the system. However, this can backfire and result in greater fluctuation of disinfectant concentration over time resulting in a longer time for the system to regain control, or alternatively over-treatment can result, especially in the case when chlorine is the primary disinfectant, creating water that has an undesirable odour and taste. In another method, if the disinfectant concentration is recommended to be adjusted in response to an instability trend, the disinfectant concentration setpoint can be temporarily raised to try to prevent the extreme fluctuations in disinfectant concentration. The disinfectant setpoint is the concentration of disinfectant that the water system sets for maintaining disinfection control in the water system, where the disinfectant concentration in the water is controlled by a disinfection pump in concert with the control system. When microbial load is high, the disinfection setpoint is raised to increase the concentration of disinfectant in the water supply to keep the microbial load at a reasonable level. When the microbial load is low, the disinfection setpoint can be set lower as less disinfectant is needed. From a biological perspective, an increase disinfectant demand is indicative of higher microbial presence in the water, and increasing the disinfectant setpoint to pump more disinfectant into the water at this time will provide sufficient treatment to control the microbial bloom. When the microbial concentration in the water distribution system drops off as a result of treatment the disinfection setpoint can be slowly lowered to ensure that the lowest levels of disinfectant are being used to control water integrity.

Because the presently described smart water treatment and monitoring system measures a variety of water parameters, an analysis of the instability trend can be done to understand whether or not the trend can be correlated with a water parameter 114. Water parameter sensors are connected at the water intake and preferably at other distal points in the water distribution network and monitor for various water parameters. Water parameters can include but are not limited to disinfectant demand vs pump output, colorimeter cell-null value, pH, hardness, alkalinity, electrical conductivity (EC), turbidity, ultraviolet (UV) absorption, colour, secondary disinfectant concentration, other residual disinfectant concentration, disinfectant degradation rate, cATP, dissolved oxygen, oxidizability, lead level or concentration, copper level or concentration, iron level or concentration, other metal level or concentration, water level, water temperature, temperature differential between two or more locations, flow speed, and pump volume. Water parameters are measured at one or more locations within the distribution network it would, preferably also consist of data automatically generated from systems that give insight into the microbiological make up of water. This data could consist of either automatic or discreet measurements, and comprises data collected over short enough periods of time such that a trend can be detected. Once an instability trend is detected and analysed, the system queries whether a water parameter be adjusted to reverse instability trend 116.

If a water parameter can be adjusted to reverse the instability trend 118 then the system undertakes the required adjustment to do so. In some cases, water parameters can be easily adjusted, such as pH and water hardness, and in some cases the system does not have the capability to adjust the parameter, such as lowering or raising temperature or changing metal concentration in the water. In other cases, adjustment of the water parameter can be done by adjusting another water parameter, such as in the case where rise in detected cATP can be treated with increasing disinfectant concentration. In yet other cases there is little that can be done to adjust the water parameter due to the constraints of the water system. In a case where a particular parameter regularly demonstrates instability, however, a component can be added to the system to more efficiently bring the water parameter back to acceptable levels. In an example, if water colour is problematic an additional filter can be added, such as one comprising charcoal, to pre-filter the water to remove the colour. The operating conditions of the filter can further be adjusted based on the sensor data to adjust to current conditions. Customization of water treatment hardware for a particular location and changing water parameters can result in reduction of water use, hardware and maintenance cost, and disinfectant use in the system.

Other considerations can also be factored into the analysis of the instability trend which can assist in diagnosis of the cause and remedial treatment. For example, external environmental, weather, and seasonal trends can all have an effect on the properties of the incoming water to the water distribution system and this data can be used in the water analysis engine to provide additional information on the cause or treatment of water instability. In particular, through machine learning it has been found that wind speed, wind direction, atmospheric air pressure, and outdoor temperature are all correlated with a rapid decrease in cell null value which is indicative of an adverse water event. In an example during winter, temperatures of 7-8° C. are not uncommon in water distribution systems. At low temperatures there is low disinfectant demand as most microbes require higher temperatures to grow and multiple. In contrast, common summer temperatures in water distribution systems can be 20-25° C. which is more conducive to microbial growth and thus has higher disinfectant demand. Seasonal and local land use practice can also have a significant effect on the amount of particulate and dissolved chemicals and minerals in the water. In places where deciduous trees lose their leaves in autumn, the amount of suspended leaf matter, decaying detritus, and soluble chemicals resulting, for example, in the degradation of chlorophylls, increase in the water supply, increasing the requirement for disinfectant to control microbial growth. One mechanism for pro-actively treating autumnal water is to increase the disinfection concentration setpoint until the season is over and the water quality improves. Detection of water turbidity, colour, or cell null value on a colorimeter, for example, can all provide information on water quality caused by autumnal leaf abscission.

In another example, summer brings higher water source temperatures which can provide more hospitable breeding conditions for microbiology. In addition, use of fertilizers, pesticides, and herbicides on local farms can have a drastic effect on the abundance and type of microbiota in the incoming water supply to the water distribution system, as well as the chemical makeup of the water. Detection of absolute temperature at the water intake site to the water distribution network, differential temperature between two or more locations within the network, electrical conductivity (EC), ultraviolet (UV) absorption, and colour, among other water parameters, can provide an indication of presence and concentration of seasonal chemical fluctuation. This is extremely useful for, for example, predicting microbial blooms, as both fertilizers and higher groundwater temperatures increase microbial growth and pro-active treatment can prevent loss of water integrity. Environmental factors such as weather, outdoor temperature, outdoor humidity, amount of daylight, elevation, local soil parameters, and storm occurrence such as wind and flooding can also contribute to changes in water quality and integrity. Integration of weather and environmental data shown to affect water integrity in the water distribution network can further provide early indicators of potential loss of control events such that pro-active action can be taken.

Figure 2:
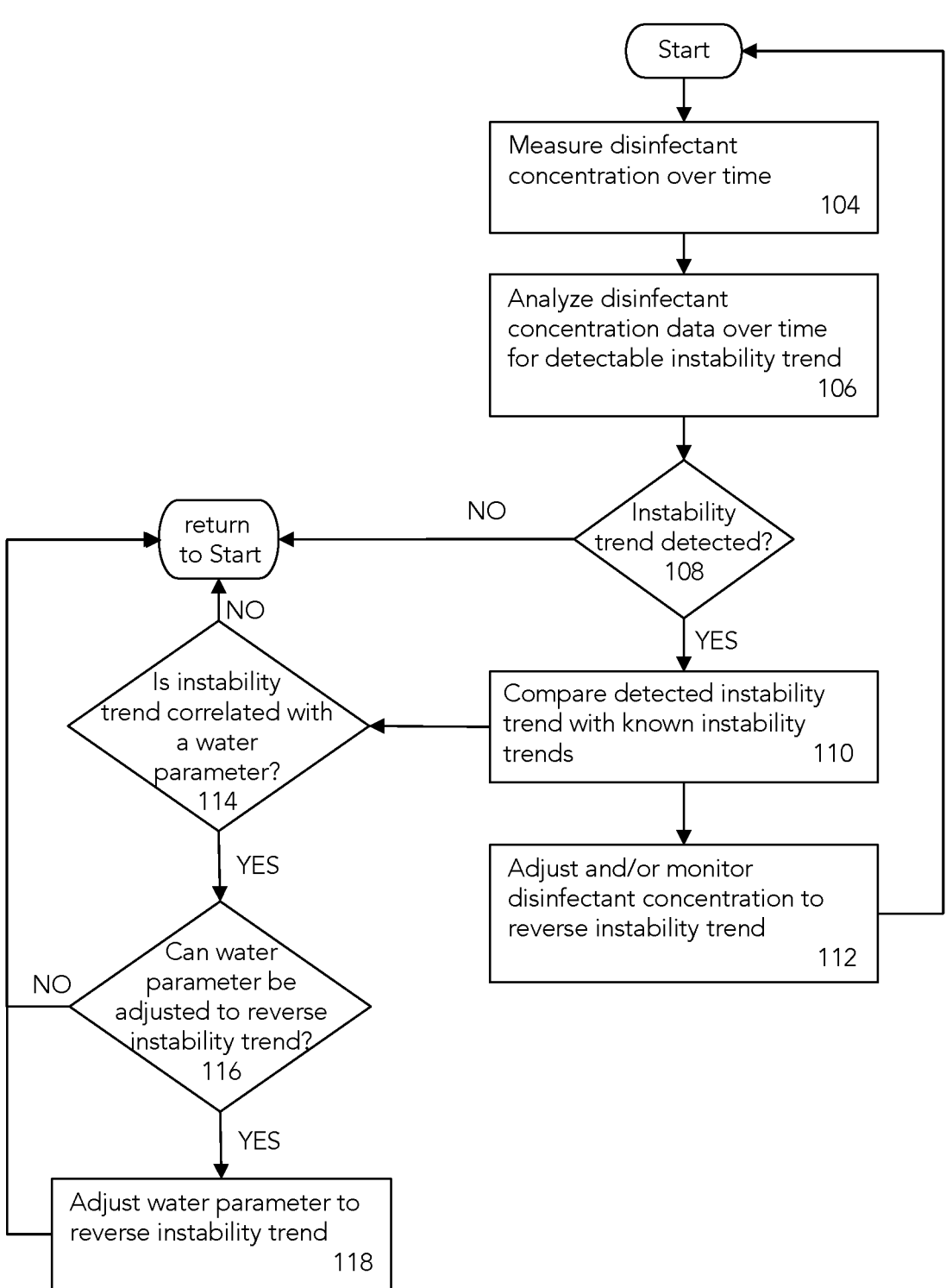
FIG. 2 is a flowchart showing another embodiment of the present invention.

FIG. 2 is a flowchart illustrating another embodiment of the present invention in the case where the disinfectant concentration alone can be used as an indicator of a future loss of control event in the water distribution system. In this case, analysis of the disinfectant residual concentration in the water system over time and comparison to previous data traces of disinfectant residual is sufficient to detect a potential instability trend. In this case, the disinfectant concentration is measured over time 104 at continuous or regular time intervals such that fluctuation patterns are visible. The disinfectant concentration data is then analyzed to see if there is a detectable instability trend 106. If an instability trend is suspected or detected 108 then the disinfectant concentration data is compared with other known instability trends 110 to provide additional information on the direction, severity, and expected time course of the instability. The disinfectant concentration can then be adjusted should the prescriptive analytics engine determine that a change in the disinfectant concentration will reverse instability trend 112. The disinfectant concentration can be changed in a number of different ways, including but not limited to pumping more disinfectant into the water system, adding a different or additional disinfectant, raising or lowering the disinfection setpoint, or changing a water parameter that is known to have an effect on reducing the instability. If the instability trend is correlated with a water parameter 114 and the water parameter can be adjusted to reverse instability trend 116 then the water parameter is adjusted to reverse instability trend 118 such that the system can respond to avoid or mitigate a future loss of control event. The water parameter can be disinfectant concentration alone, or as shown, can be a different water parameter as mentioned above.

Figure 3:
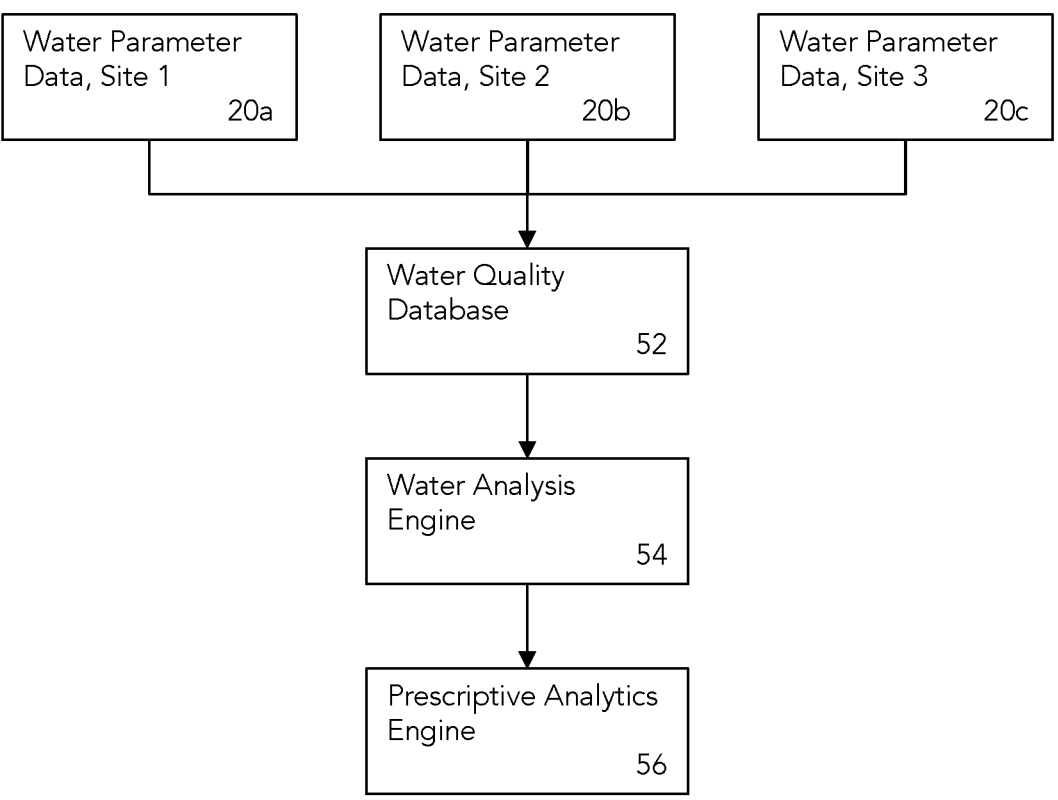
FIG. 3 illustrates an example data infrastructure of the present system.

FIG. 3 illustrates an example data infrastructure of the present system and system architecture whereby water parameter data is collected at a plurality of water use sites. The collected water parameter data 20a, 20b, 20c the various water distribution sites, is sent to a water quality database 52 which collects data from each of the sites and preferably at more than one location in the water distribution system at each site. The water parameter data 20a, 20b, 20c collected at each of the sites has data collected from at least one water parameter sensor 22, and preferably a plurality of water parameter sensors at a variety of locations throughout the water distribution system of each site. Water parameter data can include disinfectant concentration data at one or more locations in the water distribution network at each site, and can also include data on other water parameters including colorimetry data on cell null. Data can also include lab data, automatically measured data, as well as non-automatically collected discrete data that can be taken periodically by a person. Data measurements can be collected in-line, for example by in-line, on-line, or off-line means, or by other in-house sampling techniques. A water quality database 52 receives data from each of the water parameter sensors at each of the water distribution sites and puts the data through a water analysis engine 54 for statistical process analysis and multi-parameter algorithmic analysis to detect any instability trends or out of control patterns. The water analysis engine 54 also compares any detected potential instability trends against a database of known instability trends for each water parameter and detects new instability trends. The water analysis engine 54 preferably also uses artificial intelligence to detect changes in the water parameter for a particular site using statistical process control analysis to indicate when a water parameter is out of range of normal or if the system as a whole considering multiple parameters at a time is out of control.

Statistical process control uses process stability metrics on the water parameters to calculate quantitative measures of the stability of the water integrity. These metrics can then be used to identify any parameters demonstrating out of normal range behaviour with the objective of prescribing corrective action before a loss of water integrity event occurs. These metrics can also be viewed as supplementing the traditional process capability metrics. Once the system has a normal range for the metrics for each of the water parameters a correlation algorithm can be used to determine if the water parameter is in control, sub-optimal, or out of control. When the statistical process control and multi-parameter algorithmic analysis does not trigger any of the instability detection rules for a particular water parameter or set of water parameters, the water system is said to be stable or in control. A continuous analysis of water parameters using statistical process control analysis thus provides an early indication of potential loss of control of water integrity in a water distribution network. A prescriptive analytics engine 56 together with the analytics provides from the water analysis engine 54 can further provide a method or prescriptive remedy of treating the water distribution network by adjusting one or more water parameters to mitigate or remediate the loss of control event.

To detect instability trends in the water system measurements of water parameters and disinfectant concentration should be taken relatively frequently. In the case where the water instability trend is an increase in range of the water parameter or disinfectant concentration, frequent measurements are required to accurately detect the extent of the parameter range and outliers in the parameter data. In one preferred embodiment a colorimetric sensor is used to detect cell null as well as disinfectant residual concentration in the water supply. Colorimetric in-line methods can be used to measure concentration of peroxide or chlorine in the water system based on production of a reaction product that absorbs light at a selected wavelength. Preferably a reagent compound used to produce the reaction product does not have significant light absorption properties at the selected wavelength and formation of the reaction product is proportional to the amount of disinfectant in the water sample. Quantification of the reaction product is measured and then converted to a disinfectant concentration based on a standard curve. A preferred colorimetric method for measuring peroxide concentration is based on production of a reaction product that produces a yellow to orange coloured complex when potassium bis (oxalato)-oxotitanate (IV) reacts with hydrogen peroxide to form a reaction product adapted to absorb light at 470 nm proportional to the amount of hydrogen peroxide in the sample. Quantification of the reaction product is converted to a $H_2O_2$ concentration based on a standard calibration curve and the photodiode measurement data produced by the reaction product with $H_2O_2$ has been determined to correlate logarithmically with $H_2O_2$ concentration in the water supply. A common colorimetric method for measuring residual chlorine in a water system used the DPD (N, N-diethyl-p-phenylenediamine) reagent which photometrically detects the presence of $Cl_2$ in solution at wavelengths ranging from 490 nm to 555 nm. Alternatively other sensors may be used to measure disinfectant concentration, including but not limited to amperometric methods, ion selective probes, or other more distant proxies, such as, for example, an Oxidation Reduction Potential (ORP) sensor or probe, or a real time UV absorption sensor.

In the present method and system, detection of disinfectant concentration at relatively short intervals is required to detect longer range instability trends. In-line colorimetric detectors are capable of reading disinfectant concentration at least every ninety seconds, and can potentially be configured to obtain data in less time. Collection of data at 90-second intervals, for example, has been found to be sufficient to document and track disinfectant concentration trends as well as cell null values over time.

Figure 4:
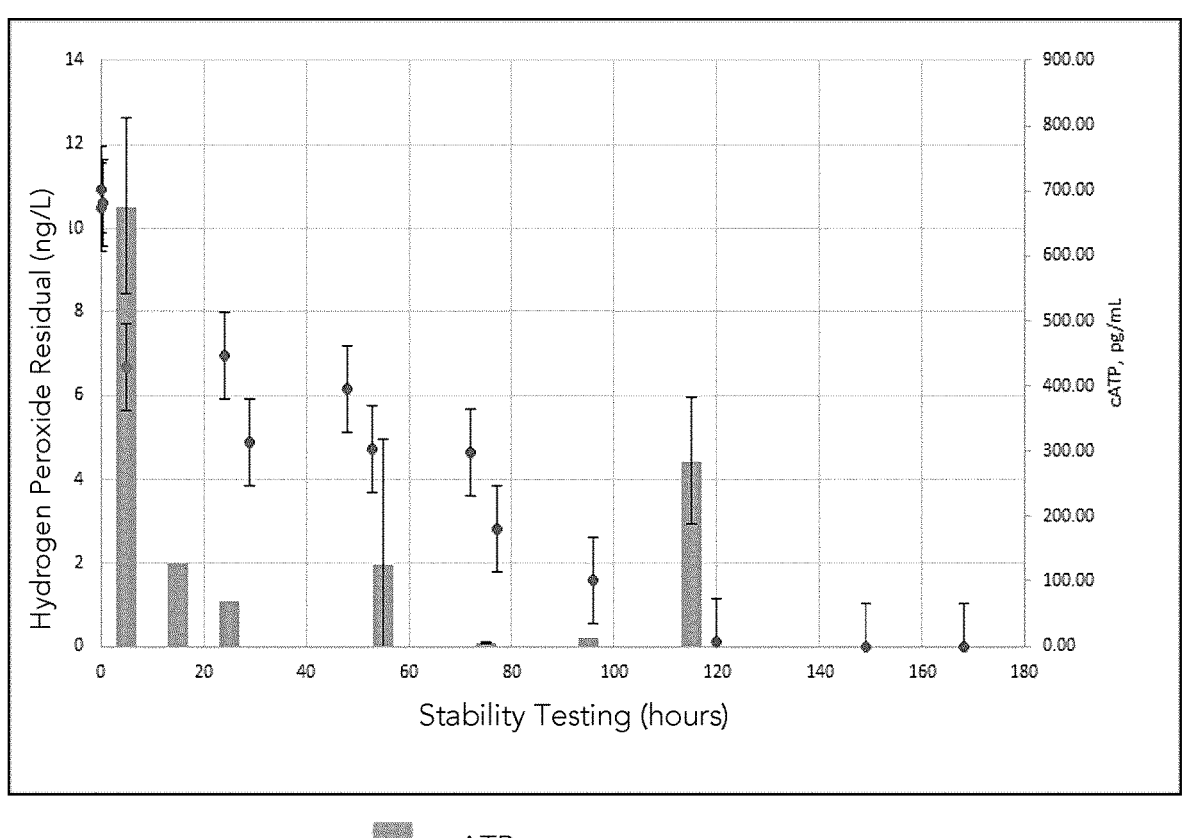
FIG. 4 graphically shows the relationship between deg- radation of disinfectant residual and cATP concentration.

FIG. 4 graphically shows the relationship between degradation of disinfectant residual and cATP concentration. As shown in FIG. 4, it has been found that disinfectant demand and the degradation rate of disinfectant in the water system is directly correlated to and predictive of a future spike in concentration of cATP in the water system, where high concentration of cATP is indicative of high microbial load and loss of water integrity. It can be observed that the concentration of hydrogen peroxide residual in the system in the system declined over time prior to the time that the concentration of cATP spikes. By tracking the rate of disinfectant (SHP) degradation and demand in the water system, it is evident that a fall in disinfectant residual will precede the cATP spike, which is indicative of microbiological growth and loss of water integrity control. In these examples, it is clear that when the residual is dropping the disinfectant pump has to work harder to keep up with the set point. As such, the detection of increasing disinfectant demand to maintain the water system at a specified setpoint is directly correlated to an increase in microbiology in the water system and early detection of an unexpected disinfectant concentration degradation is indicative of a control instability and potential future loss of control. Sudden spikes in ATP are indicative of a sudden increase in microbial growth and, if observed, can be managed quickly by increasing dosing of chemical disinfectant into the system. One example of an ATP monitoring system is a test kit and luminometer available from LuminUltra™ which is based on the reaction of ATP with oxygen and luciferin in the presence of luciferase which produces detectable light. In one ATP monitoring system, a semi-automatic digital meter can be used. In another, an integrated automated system can be configured to send a signal to the control unit or external controller.

Without adequate and early detection of instability trends indicative of microbiological growth and aggressive proactive control, a spike in microbiological growth can jeopardize the integrity of the water system. As shown, between 0-100 hours there is a slow but steady degradation in residual SHP concentration, resulting in a spike in cATP (indicative of microbiological growth) at 115 hours. With early detection of the disinfectant degradation trend and appropriate treatment efforts the microbiological growth event can be avoided. As shown, the rate of degradation of residual disinfectant correlates to rapid increases of cATP, which is indicative of microbial growth. The stability or instability of disinfectant concentration residual levels and demand can therefore provide a pro-active indication of water quality, as higher disinfectant demand in the system is a symptom of high microbial or organic load in the water. In addition to using disinfectant demand as a proxy of microbial load, water sampling and analysis can be done at various points for concentration of adenosine triphosphate concentrations or cATP, or PCR testing to quantify and identify the pathogenic load in the water supply. The results of these analyses can further lead to recommendations on corrective actions necessary for ensuring a safe supply of potable water. Periodic testing for cATP and temperature monitoring on hot and cold sides of a premise plumbing building system, for example, can help to ensure biofilm control and microbiological risk mitigation.

Figure 5:
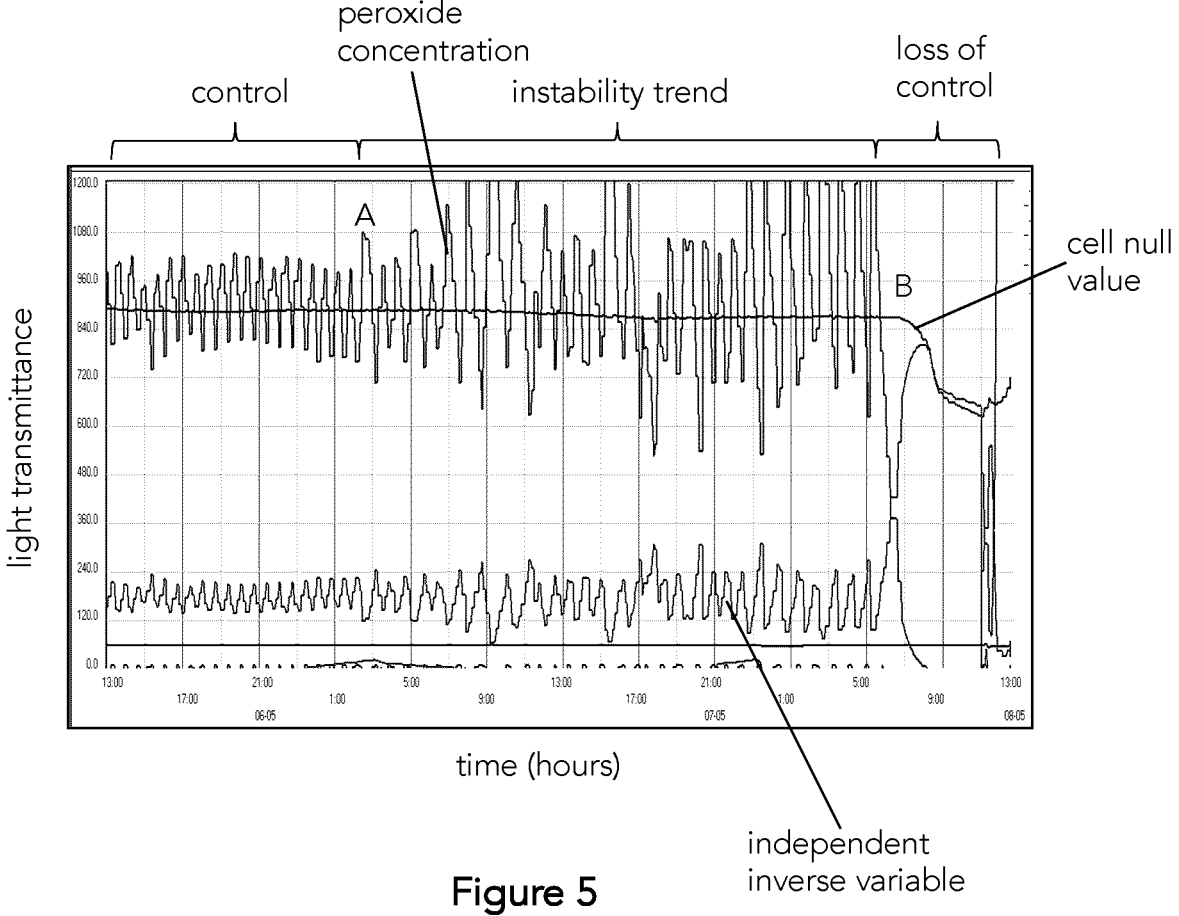
FIG. 5 is a graph showing fluctuation of hydrogen per- oxide residual concentration in a water system.

FIG. 5 is a graph showing fluctuation of hydrogen peroxide residual concentration in a water system over a 48 hour period of time. The graph shown is from a water system which uses stabilized hydrogen peroxide as the disinfectant and a colorimetric peroxide measuring system to measure peroxide residual in the system as well as a cell null value of the water in the water system. Colorimetric measurements of disinfectant concentration as well as cell null value were collected in the water system every 90 seconds. To obtain adequate data on fluctuations in cell null value as well as disinfectant concentration, periodic measurements of both cell null as well as disinfectant concentration in the water system should be taken at least every 5 minutes, and preferably more frequently, for example every 90 seconds to 3 minutes. As can be seen in the graph, between time A and time B during the instability trend shown in the peroxide concentration, the cell null value is also drifting in a downward direction prior to taking a more significant drop at time B at the loss of control event. Detecting this downward trend in cell null value can provide at least two hours and up to 5 hours or more of warning that the water system is losing integrity and is in an unstable state. Being alert to this instability can allow earlier adjustment to the disinfectant concentration in the water system to bring the system back into control and mitigate the loss of control event.

The Beer-Lambert Law (also called Beer's Law) is a relationship between the attenuation of light through a substance and the properties of that substance, also known as the light transmittance. Water in water systems carries with it a broad range of components in widely varying concentrations and compositions. Water used in human and agricultural water supplies can contain a very wide variety of contaminants, such as dissolved, emulsified, particulate, and suspended solids, which can be organic and non-organic in origin. The contribution of these make up the water matrix and contribute to the health as well as the reactivity of the water. Determination of the transmittance of a water sample provides information on the amount and identity of the contaminants in the water sample. In general, higher concentrations of organic contaminants will result in water coloration as well as light scattering, lowering the light transmittance. In addition, the presence and concentration of certain dissolved metals, such as, for example, iron and calcium, will also lower the transmittance of the water sample. A spectrophotometric comparison of light transmittance between a clean water sample with no contaminants and a cell null measurement, which is a transmittance through the water sample before any dye has been added, can provide an indication of the concentration and identity of the contaminants in the water sample.

Consider monochromatic light transmitted through a solution; with an incident intensity of $I_0$ and a transmitted intensity of I. The transmittance, T, of the solution is defined as the ratio of the transmitted intensity, I, over the incident intensity, $I_0$ and takes values between 0 and 1.

$$T = \frac{I}{I_0}$$

Or, expressed as a percentage transmittance:

$$T(\%) = 100 * \frac{I}{I_0}$$

There is an inverse relationship between the concentration of a substance in the water sample and the transmittance of the solution, wherein as the concentration of contaminating substances in the water sample increases, the transmittance of the water sample decreases. Accordingly the cell null value, which can be expressed as a percentage transmittance, can enable the determination of degree of contamination in the water sample. The independent inverse variable is a measurement of the absorbance of the water as a result of treatment with a peroxide-specific reagent, and the cell null value is the measurement from the colorimetric system of water without reagent.

The difference between the cell null value and the independent inverse variable provides the residual peroxide concentration in the system. The larger the difference between the independent inverse variable and the cell null value the greater the concentration of peroxide residual. In the data shown, the in-line colorimetric sensor is taking a peroxide reading and cell null value reading every 90 seconds. The graph in FIG. 5 shows the water system starting out relatively in control with a peroxide concentration fluctuation of between about 730 and 1030 for the first 12 hours. During this time of control the peroxide concentration is also fluctuating rapidly, with period of peak to peak distance occurring approximately every 40 minutes. At about 3:00 on the graph at location A the peroxide concentration starts to fluctuate at a greater range with less frequent peak period. Operationally, this means that the disinfectant pump is receiving a low peroxide measurement control signal relative to the disinfectant concentration set point to signal the pump inject more peroxide into the water system. For the pump to maintain the residual setpoint the pump is overshooting the peroxide concentration and then the peroxide concentration is coming down to well below the setpoint before the peroxide concentration can once again come back to the setpoint. It is noted that the first errant peak at position A on the graph already begins to look different from the control period before it, with a larger area under the curve (AUC), larger period distance from the last peak, and larger range of measured concentration from the cell null value or setpoint. In the water system, it is hypothesized that this instability trend characterized by an increase in disinfectant concentration range and spreading out of the disinfectant wave period is indicative of increase of microbial load in the water system and predictive of loss of control. By the time the significant drop in disinfectant concentration is observed at position B on the graph the water system is already out of control and will require aggressive intervention to return to control. It can further be seen that the cell null value in the colorimeter is dropping throughout the "instability trend" portion of the trace, further indicating a noticeable increase in suspended particulate in the water which causes a loss of light transmittance in the colorimeter. This graph shows the concentration of stabilized hydrogen peroxide when used as a disinfectant in a water distribution system, however the same process can be used for other disinfectants such as chlorine. As different disinfectants have different behaviours and responses to various water parameters, the statistical process analysis for each disinfectant is different and is analysed independently.

In the colorimeter there is a light emitter and light receiver on either side of the measurement cell, and the size and design of the measurement cell will influence the accuracy and efficiency of the measurement. Factors may include, but are not limited to, the path length from a light emitter to a light receiver, the light yield of the light source and the sensitivity of the light receiver, the measurement cell composition and cell wall thickness, and distance between emitter and receiver elements. The physical parameters such as measurement cell wall thickness, path length and photodiode emitter and receiver equipment are fixed once chosen and therefore can be compensated by hardware calibration and system settings. In one embodiment, the measurement cell has a width of 10 mm, a cell wall thickness of 1 mm, and a cell height of 19.5 mm. A measurement cell of these dimensions provides a sample volume of about 2 mL. Other volumes are also contemplated. The material used for the measurement cell is selected based on light transmission capabilities and resistance to degradation from water and chemical reagents.

The measurement chamber in the colorimeter comprises a light source to emit light at a selected wavelength through a measurement cell, and a photodiode receiver receives and quantifies the amount of light received. Preferably the light emitter is a LED light which emits light at 470 nm, though other wavelengths may be used. The light is transmitted through the walls of the measurement cell containing the water sample and the resulting non-absorbed light is captured on the photodiode. In one embodiment, a small current is generated in the photodiode, which is measured by an operational amplifier and converted by an analog/digital (AD) convertor to an internal standard of 1000 (Max value is 1024 colorimetric transmittance units), which is the resolution of the measurement processor. This is the null value or zero reagent sample. The cell null value can also be considered to be a measure of the light transmittance through the measurement cell based on a 100% transmittance of 1000 units for the measurement cell for a pure sample with no color, dissolved organics, metals, or suspended particulate.

Figure 6:
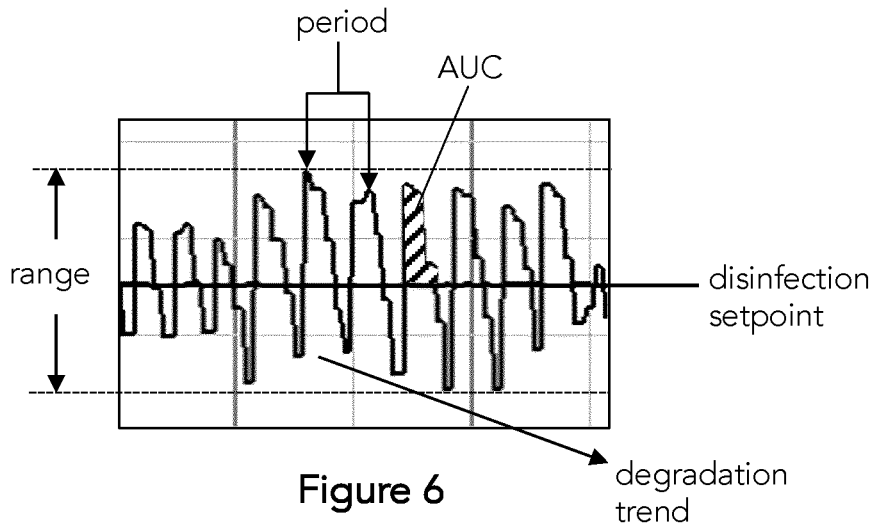
FIG. 6 graphically illustrates variables of statistical pro- cess control analysis on a disinfectant concentration trace.

FIG. 6 illustrates variables of statistical process control analysis on a disinfectant concentration trace over a short period of time. Determination of an instability trend and statistical process control analysis can be accomplished in a variety of ways depending on the variable under consideration. In the case of instability trend analysis based on disinfectant residual concentration, some trends that can be observed are fluctuation period or average peak to peak distance over a set time period, area under the curve (AUC) calculation relative to the disinfection setpoint which is an integration of the control signal, range of measured disinfectant concentration, and overall trend in average concentration. Variability in any one of these measurements is indicative of potential future instability.

Figure 7:
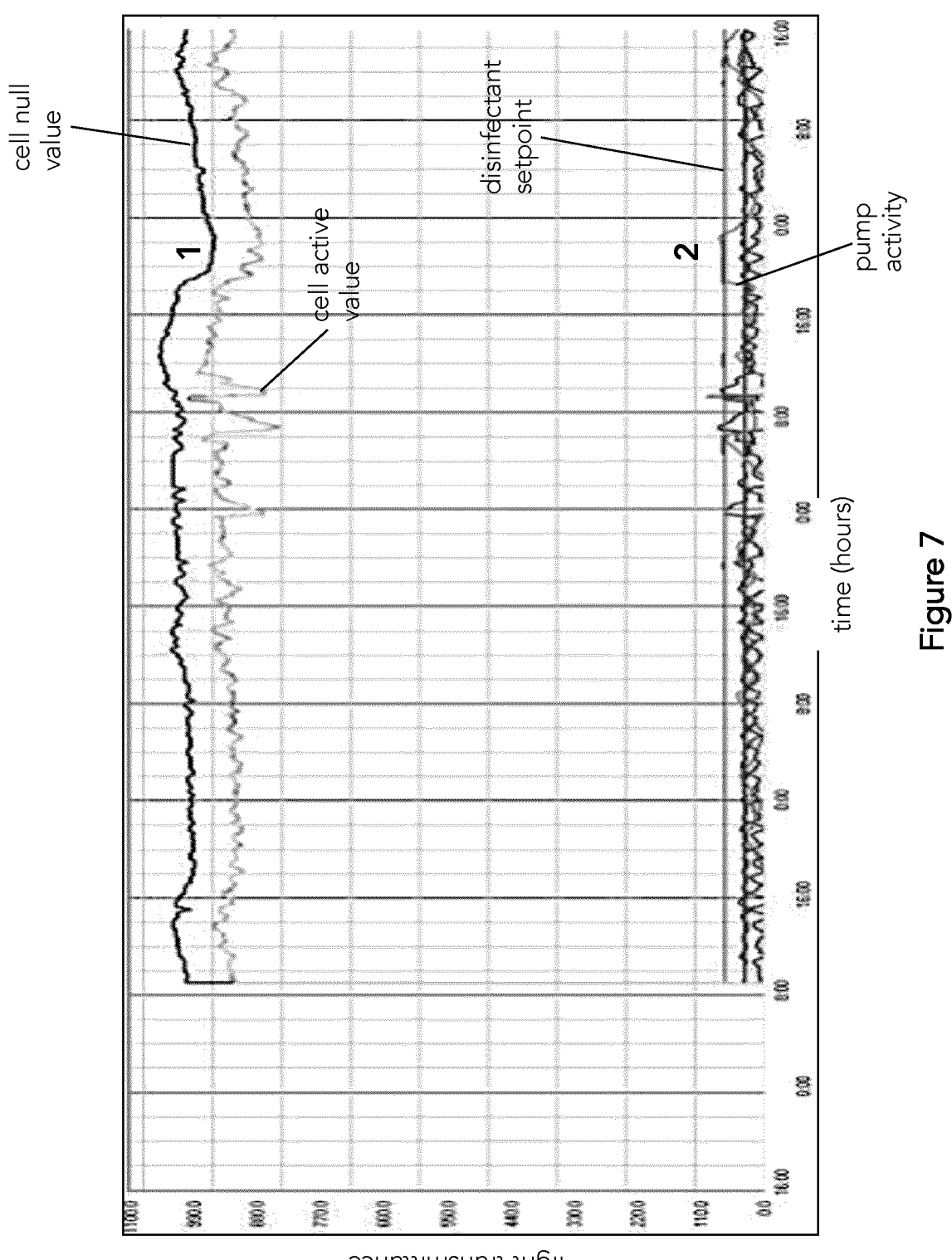
FIG. 7 graphically illustrates the variability of cell null value and disinfectant concentration as an indicator of water clarity.

FIG. 7 graphically illustrates the variability of cell null value and disinfectant concentration as an indicator of water clarity. The cell null value of the in-line colorimeter measures the optical transmittance of flowing water through the test cell in the absence of reagent, providing a proxy measurement of system water colour and turbidity, as well as microbial load. In particular, the cell null value is a measurement of the transmittance of water at a specified wavelength, which is the wavelength of the colorimeter. The data shown is from a colorimeter having a lamp wavelength of 470 nm. A drop in the cell null value indicates that the water in the system has increased particulate or an increase in dissolved coloured substance. This can occur when there is an increase in, for example, organic matter, suspended particles, dissolved or suspended metals or geological material, or higher microbial load. In the shown trace, this agricultural water supply is starting the day with the water supplied by the treated water they have stored in their silos. Then at around 1800 hours (See '1'), a pump is enabled that brings in pond water to the water system to replenish the daily consumption. At time '1' on the graph it is observed that the cell null value takes a significant dip, dropping light transmittance from 1020 to 965, demonstrating the water getting dirtier. The feedback could be to change the evening's disinfectant setpoint to accommodate the increased organic and microbial load. Likewise, as shown at position '2' the pH pump is seen to ramp up its pumping at about 76%, accounting for the required drop in pH as the incoming water starts raising the pH above the pH setpoint. In one example, a 5 to 10% drop in cell null value over a 90 minute rolling period could trigger a pump response when such that the setpoint is increased by 5-10% for either a set time frame or until the cell null returns to the cell null value prior to the intervention.

At a cell null value with a low risk threshold of about 725 or above there is little indication of risk to the integrity of the water supply and the control system maintains periodic monitoring of the cell null value without additional action. A cell null value of between about 675 and 725 can generate a caution value in the control system to alert the water control system that the water quality has dropped and that there may be risk of an adverse event or potential loss of water integrity or loss of disinfection setpoint control. A drop of cell null value before a particular low risk threshold can further trigger the control system to take more regular cell null value measurements. A cell null value of less than about 675 is an indication that the water quality is poor and that there is significant risk of an adverse event with potential loss of water integrity and/or loss of microbiological control. This drop in cell null value can trigger an alarm and alert for the control system to carefully monitor the disinfectant concentration, adjusting the disinfection setup up as needed in anticipation of a potential adverse event. It has been found that a trending drop in cell null value can provide advance warning of a disinfectant concentration instability event of 2-5 hours or more, which gives the water operators and control system time to mitigate the risk and potentially avoid the loss of water integrity event altogether.

In traditional water disinfection systems, the disinfection setpoint is set at a threshold concentration such that if the concentration of disinfectant drops below a certain point the pump injects a set amount of disinfectant into the system. The disinfection setpoint is the target disinfectant concentration in the water system and the system adjusts its controllable variables to maintain the water as close to the setpoint as possible. Controllable variables in a water system include, for example, amount of disinfectant injected into the water system over time, amount of acid (or base) injected into the water system over time to adjust the pH, temperature, as well as supplementation with other additives such as dissolved minerals and water softness. In standard water systems the disinfection setpoint seeks to keep up with a set value, often dictated by a regulation, however using close monitoring a variable setpoint allows the system to proactively identify the disinfection demand increase or decrease and will adapt to changes in water quality accordingly by moving the set point higher or lower based on microbial load. By monitoring the water parameters as process indicators, a variable setpoint algorithm can create adaptive control of water quality and can manage process water integrity in a manner that is predictive, pro-active, and preventative. This is especially useful in water systems that use chlorine as a disinfectant as excessive concentration of chlorine in the water can negatively affect the water taste and odour without contributing in a positive manner to disinfection.

Pumps can also be set to inject a set amount of disinfectant over a period of time, with periodic boosts should the measured residual disinfectant concentration drop below the setpoint or should an instability trend be detected that indicates an increase in microbial load. A traditional feedback system generally works if the water quality is relatively consistent, however in situations where there is a sudden or progressive change in one or more water parameters or microbial load, the pump can sometimes have a difficult time preventing a loss of water integrity, or event where the microbial load exceeds safe values. Early detection of changes in water parameters indicating higher than expected microbial load can be a trigger to raise the disinfection setpoint to treat the increased growth, prevent or limit instability, and also ultimately avoid loss of control.

In one example, if the disinfectant degradation after initial demand goes below a certain percentage after a certain amount of time then the set point can be automatically adjusted to a higher disinfectant concentration setpoint. If there is little demand and/or degradation after a determined amount of time, the setpoint can be automatically adjusted downward by a certain percentage or amount. If the disinfectant concentration remains at a determined percentage over time to maintain the setpoint, the setpoint can remain unchanged. If the disinfectant concentration changes, for example plus or minus 20% over a designated amount of time, then the setpoint can also adjust up or down by the same percentage. In another example, if the temperature changes significantly, such as by plus or minus 2° C. and the disinfection demand changes accordingly, then the setpoint can also be changed accordingly. The rate of degradation and demand would calculate the requirement to move the setpoint up or down, depending on the local water quality. The same feedback mechanism also works concurrently with pH measurement and demand. It is also noted that key water parameters such as disinfection demand (microbial load), temperature, (and others potentially) and pH affect one another, and control systems and method that measure and optimize these key water parameters together are more effective at maintaining control of water integrity than by adjusting each water parameter independently.

Other water distribution systems exist that do not have a circulating chemical disinfectant whose concentration can be measured as a proxy for microbial concentration and process control. Some examples of systems like this include primary ozone disinfection systems where water is treated with ozone as a disinfectant and the ozone quickly degrades, primary disinfection with ultraviolet (UV) light systems where water for distribution is exposed to UV light for the purposes of killing or disabling pathogenic microbes, and untreated systems where water is used directly from a natural or treatment source. In these cases, in-line water samples can be drawn periodically from the water distribution network and cell null measurement in these water systems can provide data on water system integrity. Other key water parameters that can also be measured and optimized that also have an effect on other water parameters and water quality include dissolved oxygen and conductivity. It is known that the amount of dissolved oxygen in a water system is dependent on temperature, with amount of dissolved oxygen concentration dropping as temperature increases. Conductivity is a measurement of the concentration of dissolved salts or minerals in solution and can be indicative of water quality. It is also known that conductivity increases with temperature, accordingly a calculation adjustment can be made taking both temperature and conductivity into account when assessing water quality, diagnosis of any problems, and treatment of the problem.

Figure 8:
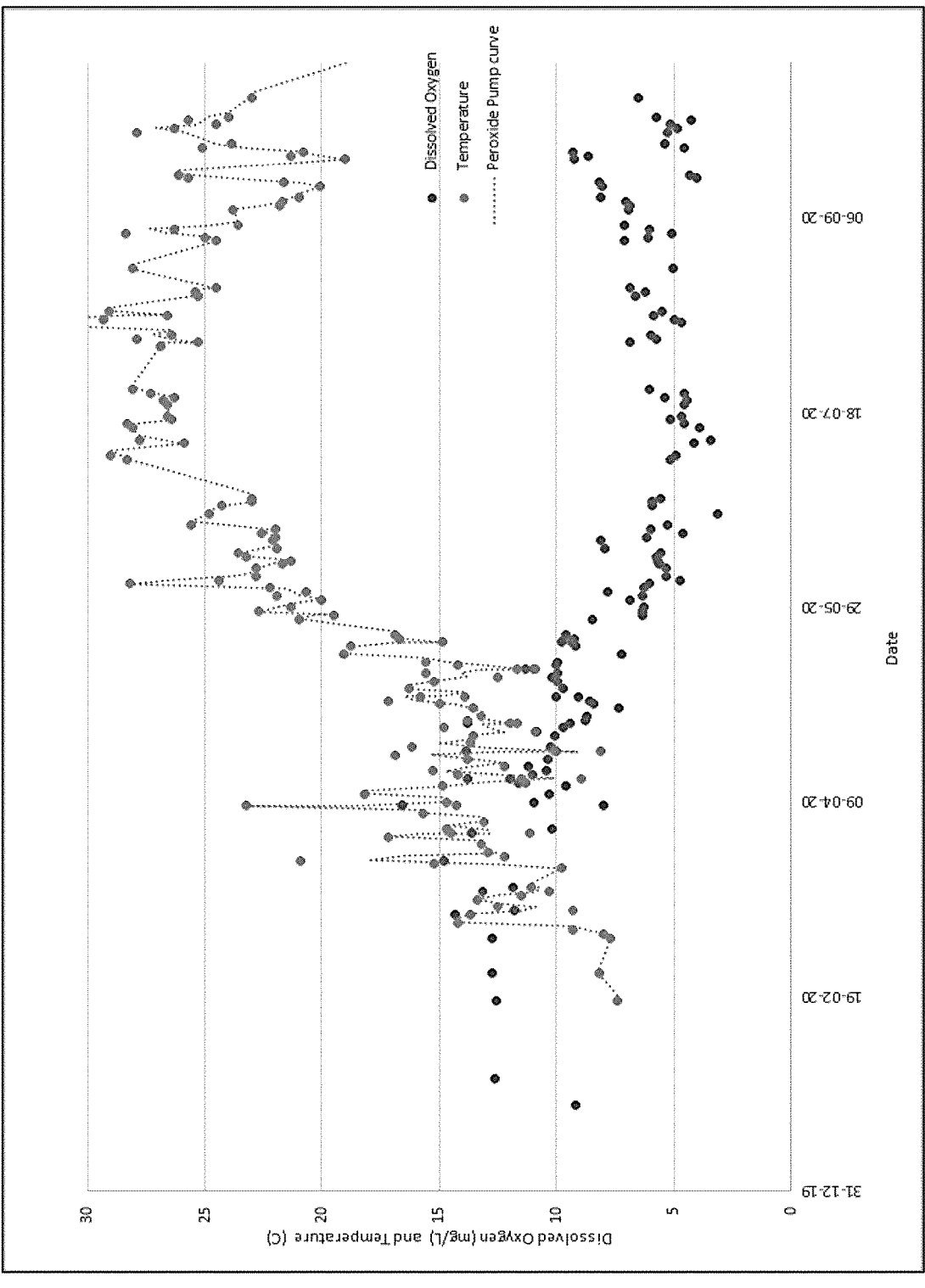
FIG. 8 graphically depicts the association between dis- solved oxygen and temperature in a water system.

FIG. 8 graphically depicts the association between dissolved oxygen and temperature in a water system. This is data collected over a winter to spring to summer season. It clearly demonstrates that dissolved oxygen levels will go down proportionally to the temperature increase which makes temperature a suitable correlation indicator with disinfectant demand instability and microbiological changes.

Figure 9:
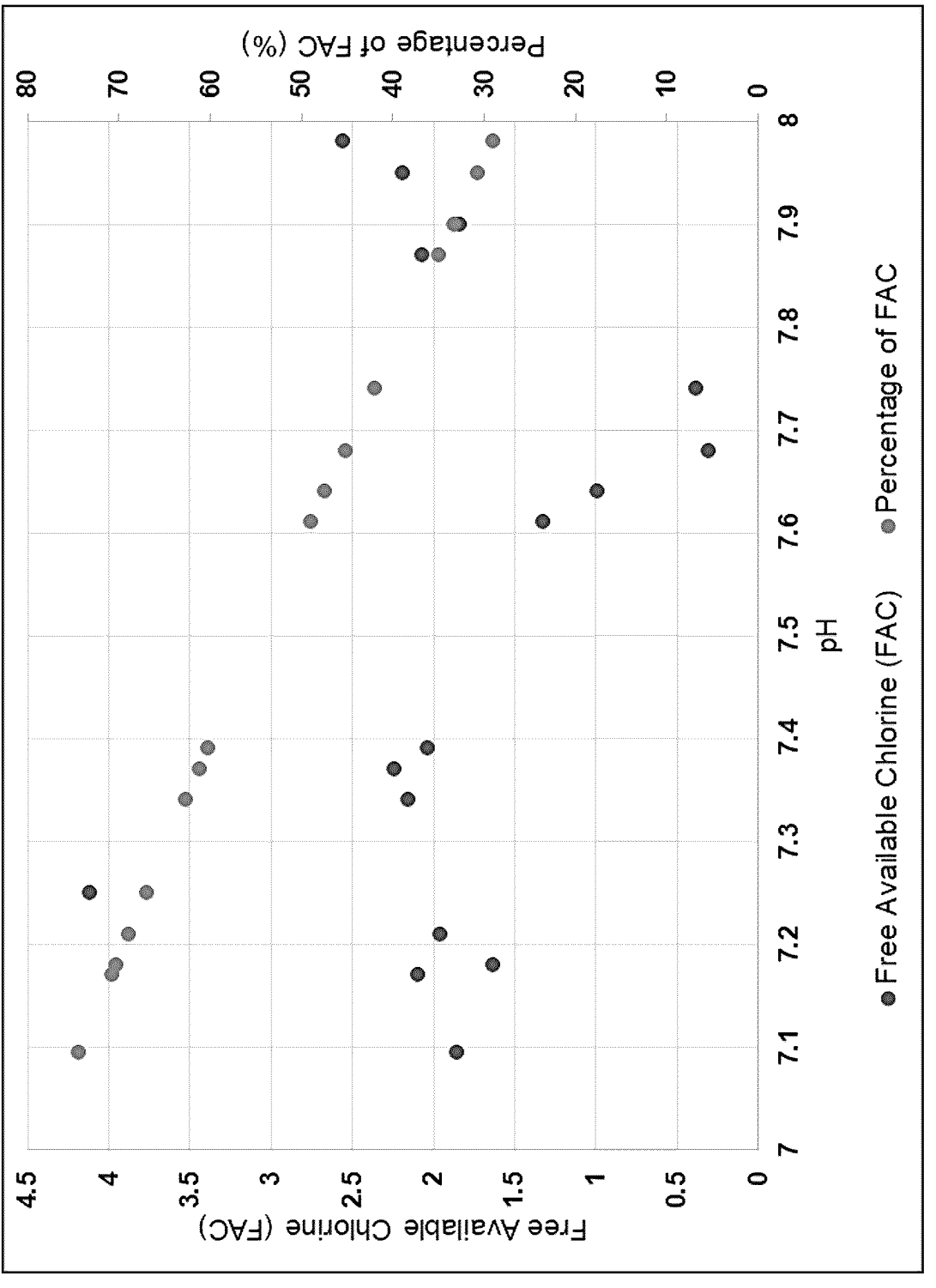
FIG. 9 graphically depicts the association between free available chlorine and pH in a water system.

FIG. 9 graphically depicts the association between free available chlorine and pH in a water system with chlorine used as a chemical disinfectant. It can be seen from the graph that an increase in pH can anticipate instability and disinfectant availability reduction.

Figure 10:
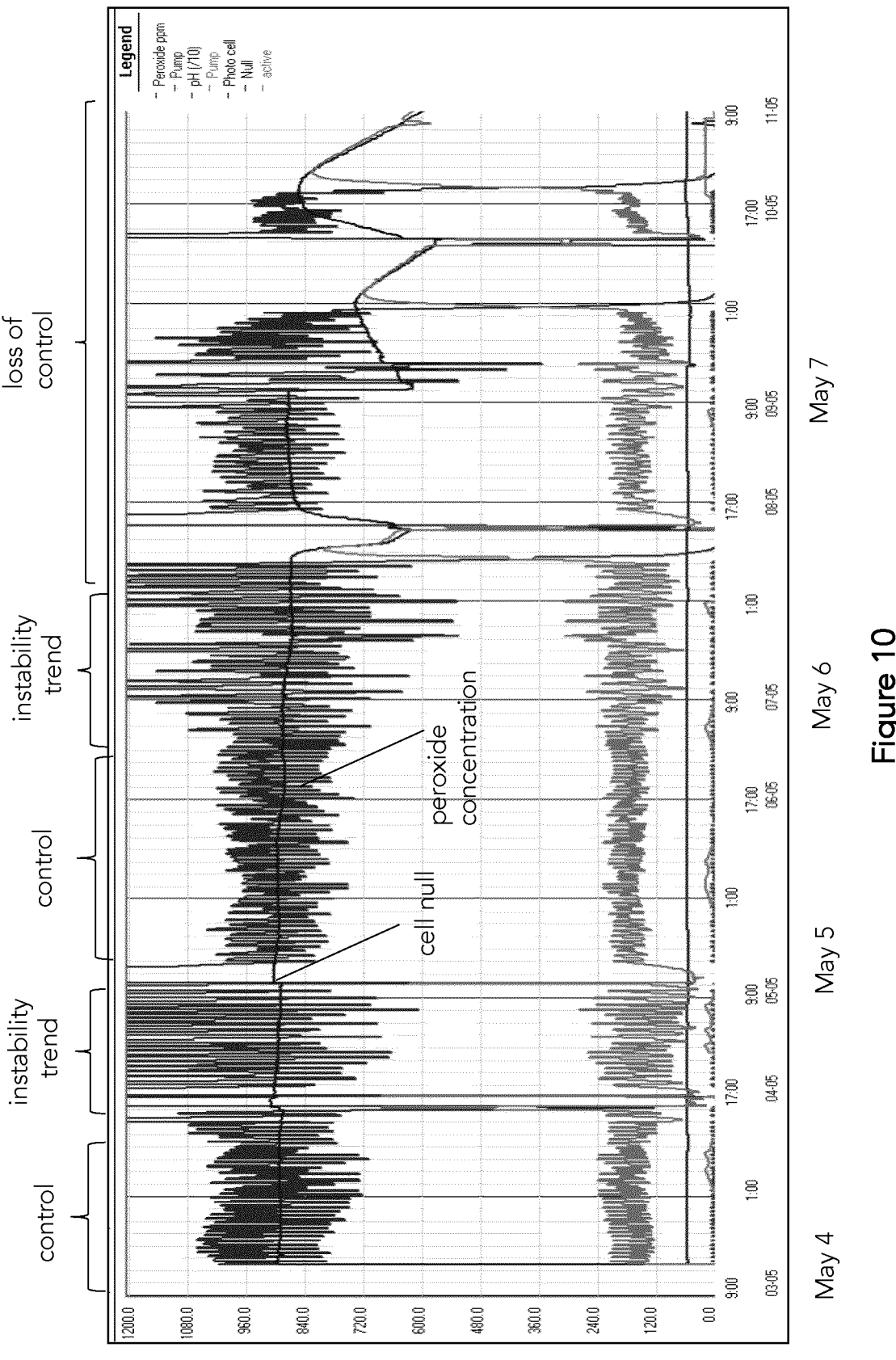
FIG. 10 graphically depicts another example of the vari- ability in concentration of disinfectant over time correlated with pump activity.

FIG. 10 graphically depicts another example of the variability testing in concentration of disinfectant over time correlated with pump activity. The solid line on the top trace represents the cell null value and the fluctuating line represents the concentration of hydrogen peroxide in the system. Some indications of good disinfection control is a rapidly fluctuating peroxide concentration with short period and low minimum-maximum range, which can be seen early in the day on May $4^{th}$. An in control water system will also show a relatively constant cell null value as also observed during this period of time. At 17:00 on the testing on May $4^{th}$, peroxide was spike dosed into the water system. This leads to significant increase to the cell null value. It also changes the following peroxide residual in relation to pump action, whereby an addition of peroxide from the pump leads to a much greater development of peroxide residual. Then on May $5^{th}$ at 09:00, again there was a manual spike addition of peroxide, which once again serves to increase the cell null value, further resulting a period of stable control of the peroxide residual. During the more stable period of disinfectant concentration on May $5^{th}$ the cell null values are still trending in a downward direction, which is indicative of instability in the water system and an early indication of an adverse event in the future. Instability creeps in again on May $6^{th}$ when at 03:00 there is a problem with peroxide dosing. In particular, in this set of events peroxide dosing stopped and no peroxide was added to the water loop. At this time it can be seen that the cell null value drops considerably. At 16:00 on May $6^{th}$ peroxide is once again added to the water loop and the cell null once again returns to its nominal value and control is maintained once again from 18:00 through to about 07:30 on May $7^{th}$, where once again control is lost. The evident and extreme fluctuation of cell null value is evident at the same time that disinfectant concentration is demonstrating instability and loss of control events. More importantly, the decreasing trend in cell null over time during a period of what otherwise looks like disinfectant concentration control on May $5^{th}$ is predictive of a future adverse water event that could have been avoided or mitigated by increasing the disinfection setpoint of the system.

Figure 11:
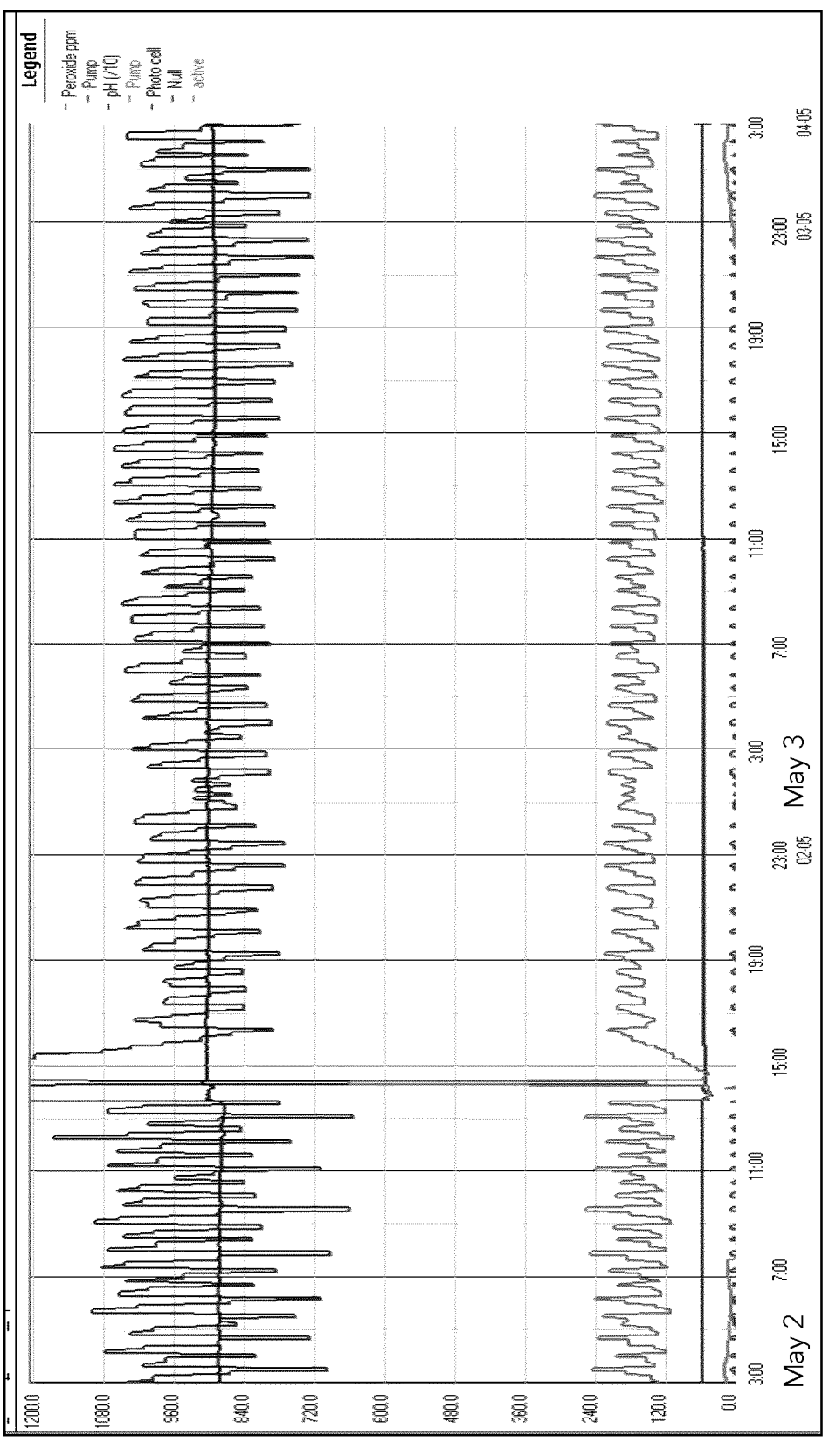
FIG. 11 graphically depicts another example of the vari- ability in concentration of disinfectant over time correlated with pump activity.

FIG. 11 graphically depicts another example of the variability in concentration of disinfectant over time correlated with pump activity. As above, it can be seen that the cell null, climbs dramatically at 1330 on the $2^{nd}$ of May. Good control of peroxide residual can be seen following that spike, throughout end of day on the $2^{nd}$ of May and the entirety of the $3^{rd}$ of May.

Figure 12:
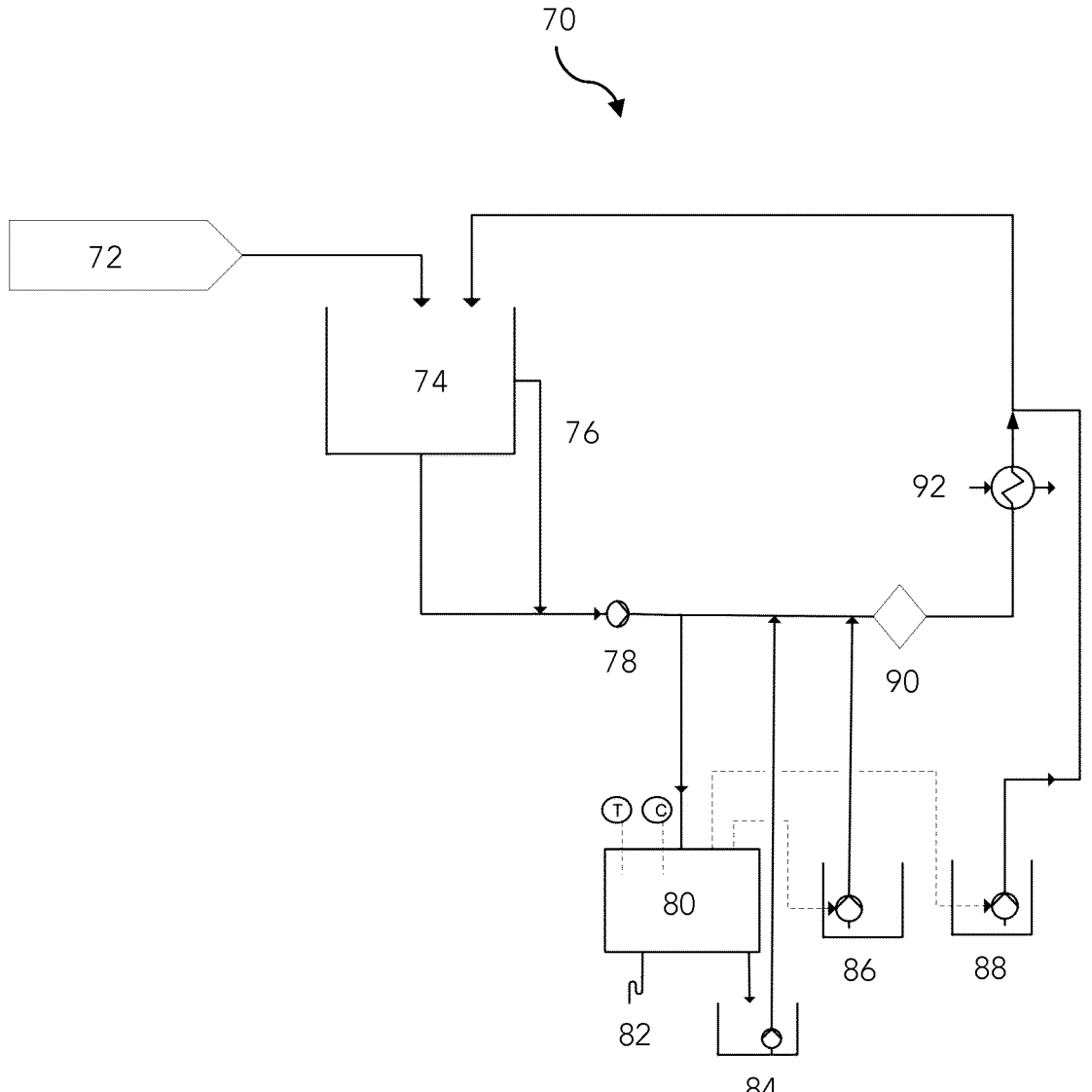
FIG. 12 is a piping and instrumentation diagram of an embodiment of the present system.

FIG. 12 is a piping and instrumentation diagram of an embodiment of the present system showing the piping and process equipment in a water distribution system 70 together with instrumentation and control devices. Water intake 72 receives water from a municipal, groundwater, surface water, or other water source. An optional holding tank 74 stores the water, which can assist with water settling and sedimentation. Overflow weir 76 directs overflow water out of the system. Disinfectant pump 78 injects a chemical disinfectant into the water distribution system. Control board 80 comprises a device for measuring concentration of disinfectant residual in a water sample from the water system. In the present system this control board comprises a colorimeter for measuring disinfectant concentration as well as cell null value. Drain 82 removes any used water from a water measurement device that cannot be returned to the water distribution system to a waste. Overflow tank 84 receives water from a water measurement system at the control board that can be returned to the water distribution system and returns it to the water distribution system. One or more pH adjustment supply tank 86 comprises an acid or base for adjusting the pH of the water in the water distribution system. One or more disinfectant supply tank 88 comprises a chemical disinfectant for adding disinfectant to the water system. An optional pre-treatment device 90 such as a filter can provide an additional level of treatment or filtration to the water. Optional heat exchanger 92 can adjust the temperature of the water in the water system as desired.

Communication between devices in the system such as the control board 80 through a network connection such as a router can use a number of technologies, where each technology could provide an advantage in cost or reliability for each communication segment. Sensor data from the sensors in the water distribution system can be provided through the network connection to a central computer or cloud computing site for analysing incoming data and for managing the system components to maintain water integrity. Data can be gathered through the network connection from the cloud and water parameter sensor data (e.g., pressure sensors, flow sensors, temperature sensors, disinfectant pump speed, control valve positions, etc.) can also be collected and shared with the water quality database, water analysis engine for doing statistical process analysis, and prescriptive analytics engine to provide instructions back to the control system to control the system parameters to keep the water in the distribution system in control. As discussed, the water quality database, water analysis engine, and/or the prescriptive analytics engine can also call upon one or more a big data subsystem or database for receiving input from other water distribution systems, and/or from manufacturers and suppliers for receiving external data regarding the specific inputs and components in the specific on-site system. One or more of the components can also be remotely controlled through a network connection to another system such as a remote server, cloud-based control system, remote computer system, smart device (such as a smart phone, smart speaker, smart chip, etc.) A wide variety of wired and wireless connections to the sensors and equipment can be used, including but not limited to Bluetooth, WiFi, RF mesh, wired ethernet, cellular connection, and satellite connection. Each sensor and control device can also comprise one or more processor or microprocessor to provide local processing capability. Each processor is preferably in communication with a memory and one or more non-volatile memories for storing one or more local control programs for providing local control of the sensor or control device in which the subsystem is installed. A TCP/IP stack can further be provided for allowing each of the data collection or control devices to obtain an internet protocol address and to provide internet connectivity.

In one method, the water distribution system establishes a network connection between the processor and a plurality of water quality parameter sensor devices and monitors water quality parameters of the water system over the network connection. A processor in the disinfectant pump sets the pump at a desired disinfection setpoint, and the system analysis is carried out with expected valued for the monitored operational water parameter of the water system. The disinfection setpoint can be determined based on the monitored operational parameters and the desired value for the monitored operational parameter of the water disinfection system, and the disinfectant pump is controlled to operate at the setpoint. The setpoint is determined by the prescriptive analytics engine which collates data from the water quality database and water analysis engine and determines the disinfection setpoint based on the analysis. In one example, when the concentration of disinfectant over time drops below a certain percentage of what is considered stable or in control, the disinfection can be adjusted to another percentage over the previous setpoint amount until the disinfectant concentration stabilizes for an amount of time indicative of re-establishment of stability of control. Alternatively, other water parameter predictors or combination of multiple water parameters in a multi-parameter algorithm can be used to predict future loss of control events to change the disinfection setpoint or pump speed to mitigate or avoid the adverse event. Prediction and prevention steps can then be implemented in the water distribution system based on detection of an instability trend or out of normal control range which is indicative of a control problem in the system. These steps can include but not limited to changing the disinfection concentration set point on the control board, engaging one or more backwash filters or using one or more filters more or less frequently, changing physical filter media, checking and cleaning actuators at pumps and detection systems, checking and adjusting ozone generation or UV lamps, and cleaning UV lamps. The presently described method and system can be implemented in directional as well as circulating water systems and may be adapted to automated water sampling and measurement processes in a variety of industries including but not limited to plant agriculture and horticulture, animal husbandry, premise plumbing, municipal water systems, aquaculture, food processing facilities, and recreational water systems.

Figure 13:
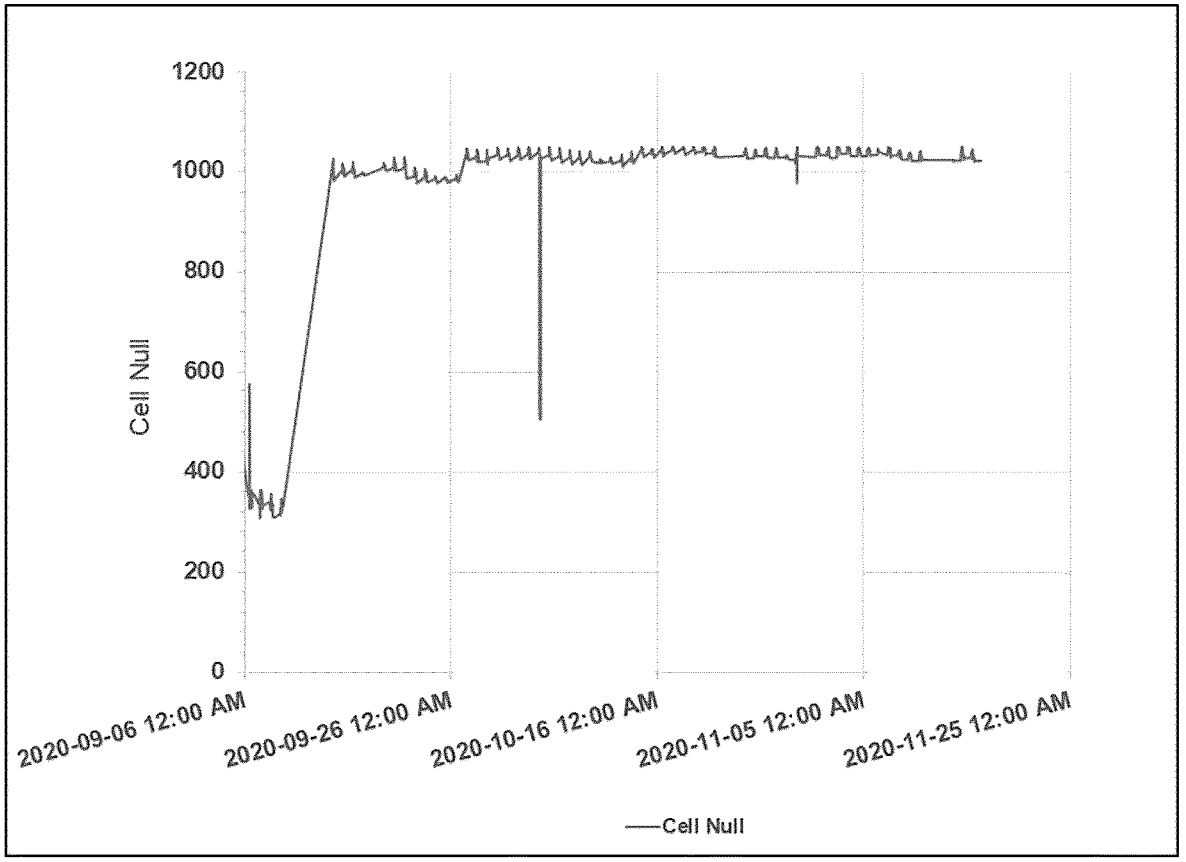
FIG. 13 is a graph of the cell null value over time before and after a filter change.

FIG. 13 is a graph of the cell null value over time before and after a filter change. At the graph start the cell null value is between 300-400, which is indicative of high particulate matter in the water. At or around 20200926 the data shows an increase in the cell null value, which corresponds with a change in filtration modality, moving from sand to zeolite/meltblown. A lower cell null value is usually indicative of particulate or suspended or coloured matter in the water supply and a change in filtration medium can remove said dissolved or suspended matter and raise the cell null value. Accordingly, a noticeable lowering or decrease in cell null value can indicate that a change in filtration modality will assist with water purification, clarification, or discolouration.

Example 1: Surface Water Testing

Surface water sample was collected from the Rideau River in Manotick, Ontario, which represents surface water with a relatively high microbial load and organic matter. Table 1 shows the cATP Testing Results of Rideau River Water and Table 2 shows the $H_2O_2$ and ATP Monitoring Results of Rideau River Water. As observed, levels of $H_2O_2$ disinfectant remained relatively stable with minimal residual loss (<1 ppm) for 3 days. A sharp decline of peroxide residuals was observed in both water samples after 91 hrs. Residual loss was higher in the sample dosed with SHP1 (from 10.2 to 5.6) than in the sample dosed with SHP2 (from 10.5 to 7.75). Significant increase in cATP were observed after 96 hrs. cATP found in water dosed with SHP1 was over 2 times higher than the cATP found in water dosed with SHP2 which shows the residual as roughly double. Both SHP1 and SHP2 are silver stabilized peroxides with in-situ stability mechanisms. SHP 1 has a 15% higher silver concentration than SHP 2. Both are suitable biomarkers but SHP 2 shows greater stability trends. An evaluation of disinfectant suitability can also be used as a biomarker, based on microbiologically induced corrosion (MIC) as well as stability, reactivity, and degradation over time by observing the graphs and correlation of key performance indicators.

TABLE 1

| cATP Testing Results of Rideau River Water | | | | | | |
|---|---|---|---|---|---|---|
| Water Source | pH | Temp (° C.) | cATP 1 (pg/ml) | cATP 2 (pg/ml) | cATP 3 (pg/ml) | Avg cATP (pg/ml) |
| Surface Water | 7.768 | 23.0 | 655.23 | 707.10 | 734.05 | 698.79 |

TABLE 2

| H$_2$O$_2$ and ATP Monitoring Results of Rideau River Water | | | | |
|---|---|---|---|---|
| Day | Date/Time | Parameter | SHP1 5% | SHP2 5% |
| 0 | Aug12-2pm | H$_2$O$_2$ (ppm) | 10.2 | 10.5 |
| | | pH | 7.963 | 7.981 |
| | | T (° C.) | 23.5 | 23.4 |
| | Aug13-9am | H$_2$O$_2$ (ppm) | 9.5-9.6 | 9.7 |
| 1 | Aug13-2pm | H$_2$O$_2$ (ppm) | 9.7-9.8 | 9.7-9.8 |
| | | pH | 8.000 | 7.993 |
| | | T (° C.) | 22.9 | 22.9 |
| | | cATP (pg/ml) | 15.37 | 13.36 |
| | Aug14-9am | H$_2$O$_2$ (ppm) | 9.7-9.8 | 9.6-9.7 |
| 2 | Aug14-2pm | H$_2$O$_2$ (ppm) | 9.4-9.5 | 9.5 |
| | | cATP (pg/ml) | 5.29 | 5.58 |
| | Aug15-9am | H$_2$O$_2$ (ppm) | 9.4-9.5 | 9.6-9.7 |
| 3 | Aug15-2pm | H$_2$O$_2$ (ppm) | 9.3 | 9.3-9.4 |
| | | pH | 8.045 | 8.034 |
| | | T (° C.) | 23.3 | 23.3 |
| | | cATP (pg/ml) | 11.86 | 8.46 |
| | Aug16-9am | H$_2$O$_2$ (ppm) | 5.6 | 7.7-7.8 |
| 4 | Aug16-2pm | H$_2$O$_2$ (ppm) | 3.1-3.2 | 5.6-5.7 |
| | | cATP 1 (pg/ml) | 192.27 | 95.78 |
| | | cATP 2 (pg/ml) | 240.18 | 93.87 |
| | Aug19-9am | H$_2$O$_2$ (ppm) | 0 | 0 |
| 7 | Aug19-2pm | H$_2$O$_2$ (ppm) | 0 | 0 |
| | | pH | 8.036 | 8.037 |
| | | T (° C.) | 23.2 | 23.2 |
| | | cATP (pg/ml) | 508.38 | 289.75 |

Example 2: Machine Learning-Predicting Future Cell Null Value

The cell null value can be predicted in the future given an input of various system parameters using classification. Water parameters which can be used in concert with cell null to predict the future of the cell null value can include, for example, water temperature, pH, disinfectant pump speed, disinfectant concentration, and water flow measurement. Using classification and time window analysis across these variables have been found to provide a reasonable prediction of the future of the cell null value. In addition, a rapid degradation in cell null has been found to correlate with loss of water control events as previously described, accordingly predicting a significant degradation of cell null with advanced warning enables the system to adjust certain water parameters such as disinfectant concentration to mitigate or avoid a loss of water integrity event.

Figure 14:
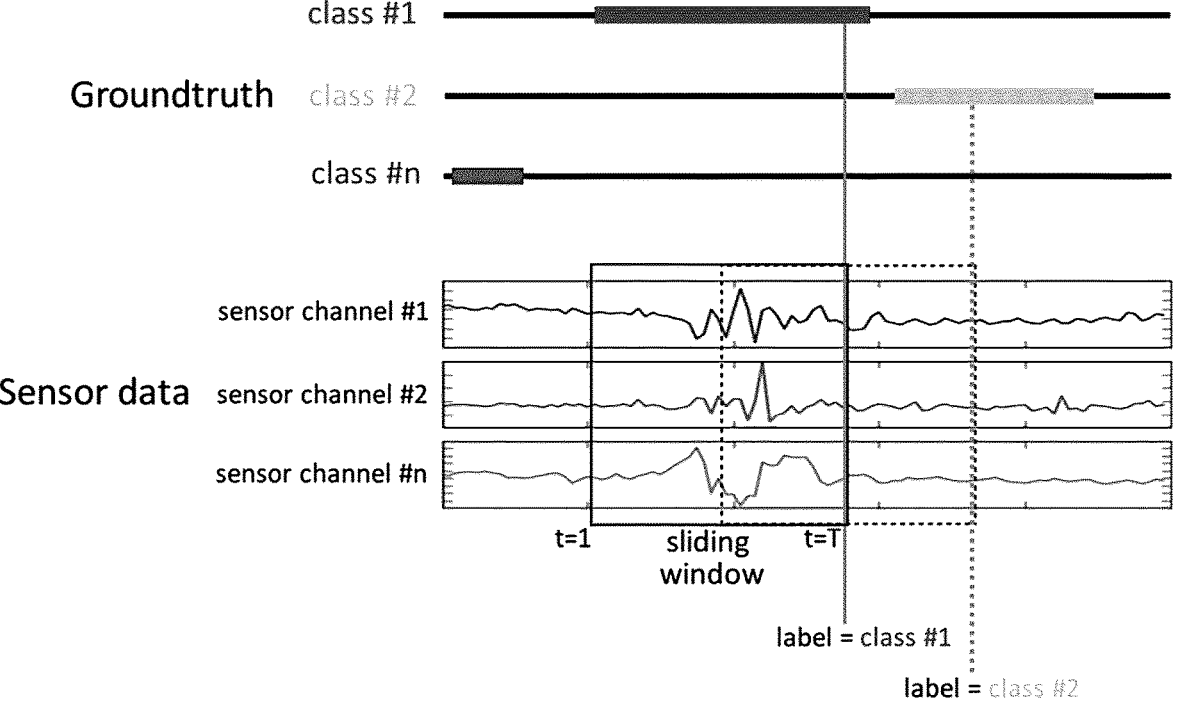
FIG. 14 is an illustration of a multi-channel time win- dowing using sensor channels in the present water system.

A machine learning technique was used to determine the relationship of cell null to other parameters in order to provide a prediction of the future value of cell null and potentially predict a loss of integrity event in the water system. Using time windowing the individual variables were observed to see how the variables are changing within the time window. FIG. 14 is an illustration of a multi-channel time windowing using sensor channels in the present water system. The collected data required for this kind of time windowing analysis in the water system needs to be continuous over a longer period of time in order to provide the data trends required for analysis of each parameter window over time. In the present water system data is collected continuously for a multitude of water variables, including but not limited to cell null value, water temperature, pH, disinfectant pump speed, disinfectant concentration, and water flow measurement. In a single sensor channel time window of a short period of time, there are several features that can describe the behaviour of the particular variable in the time window, such as, for example, standard deviation, mean squared, fast Fourier transform coefficient, mean, median, maximum, minimum, number of peaks in the window. These window features describe how the variable is changing over time and provide granular data on the data features over that time period. In one example, if there is a lot of fluctuation in the water parameter variable then the standard deviation would be high. In another example, mean parameter values in the time window compared to an average over a longer period of time can indicate a feature trend. Feature extraction starts from this initial set of measured data and builds derived values (features) which can be informative in facilitating the subsequent machine learning model.

Figure 15:
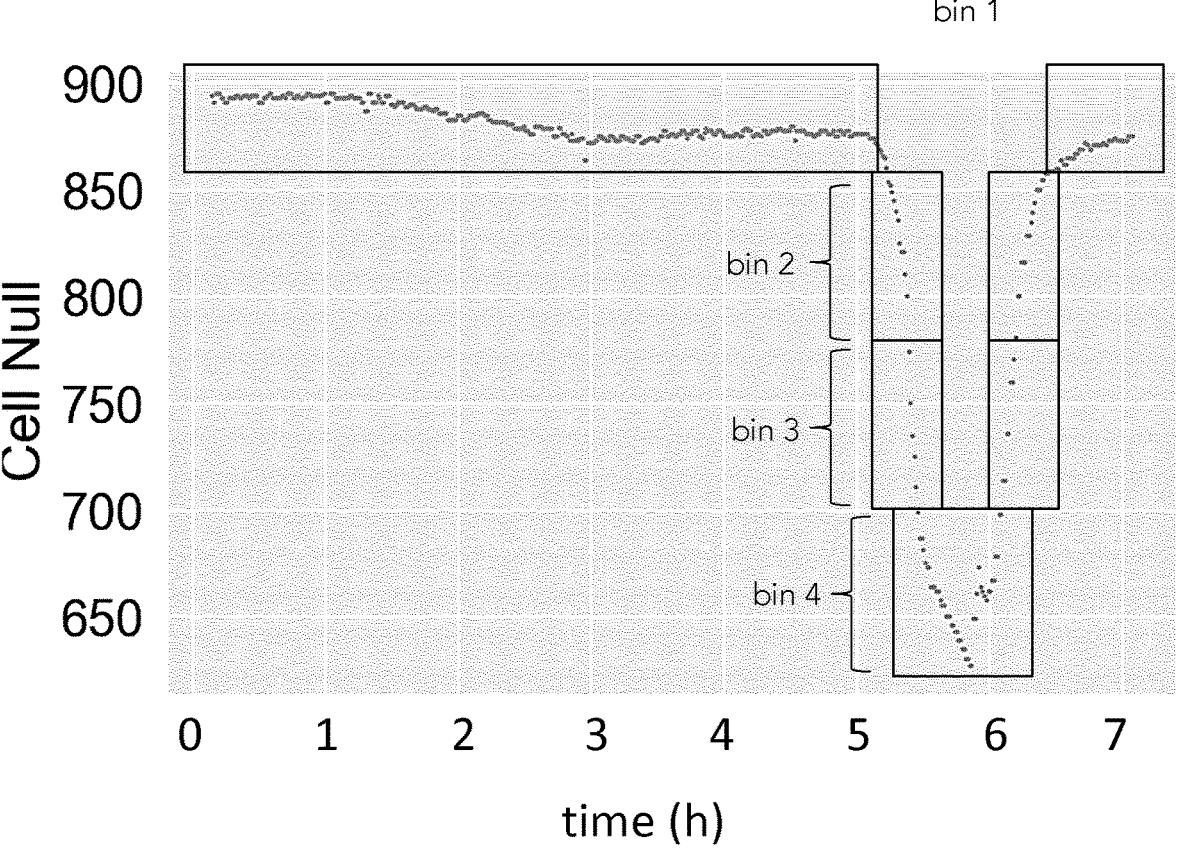
FIG. 15 is a graph of cell null over a period of hours showing a slow decline followed by a rapid drop event.
Figure 16:
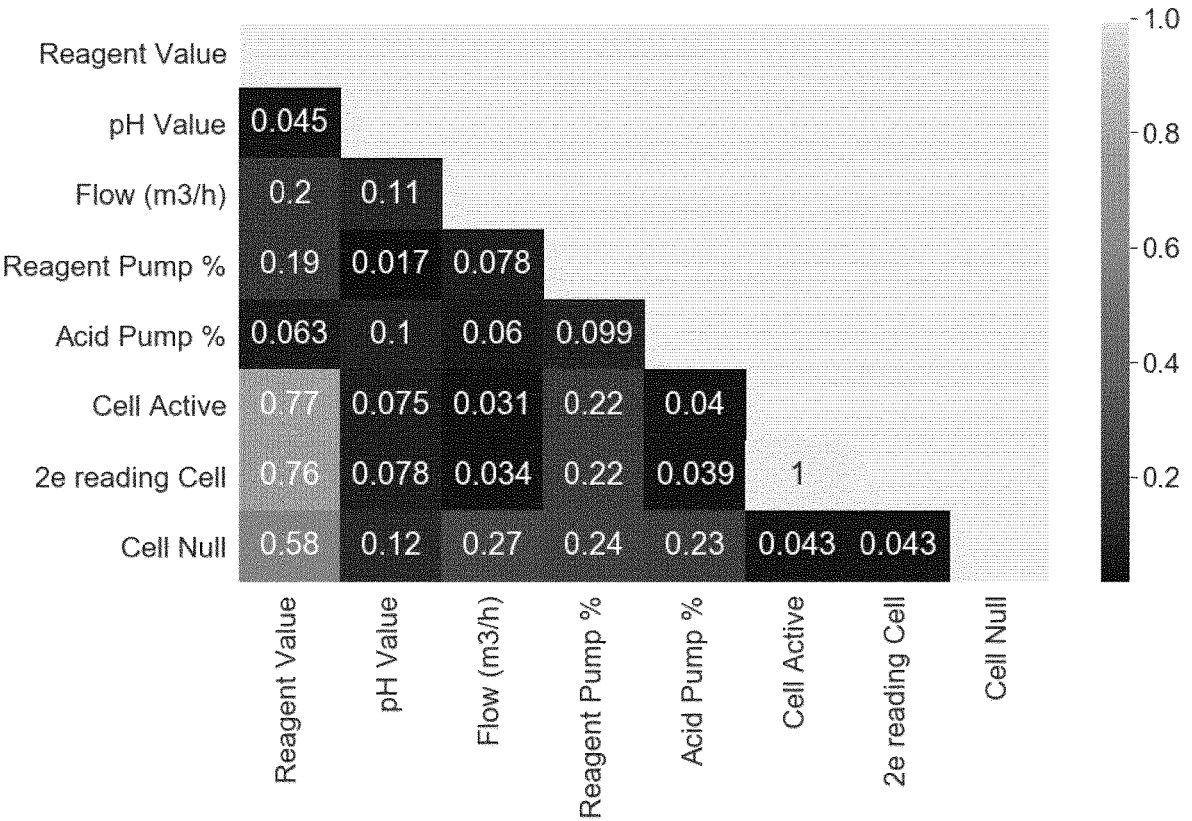
FIG. 16 is a correlation matrix of various water param- eters in the water system.

The cell null values were also binned by parameter range and compared to earlier water parameter windows to determine whether cell null value could be predicted in advance. FIG. 15 is a graph of cell null over a period of hours showing a slow decline followed by a rapid drop event. Bin 1 encompasses cell null values in a normal range, however it is evident in the graph that at time=1 hr the cell null is already starting to trend in a downward direction. Bins 2, 3, and 4 encompass cell null values in the abnormal range, with bin 4 being the lowest value with lowest value. Providing classified data to the machine learning system enables the system to train and recognize trends to predict future events. As shown in FIG. 15, gradual degradation of the cell null value over hours 2-4 can be an early predictor of the rapid degradation at time=5 hours, about three hours after the trend is first recognized. In combination with other correlated water parameters the system can be trained to better recognize the adverse event, however it has been found that detection of a trend in cell null has a strong contribution to the prediction of a downstream adverse water event. A drop in cell null value is directly correlated to increased contamination in the water system as there is a direct relationship between the light transmittance through a water sample and the amount of particulate, organics, and microbial contamination in the water system. Accordingly, predicting a drop in cell null value is extremely valuable information to know as the contamination can be mitigated early by, for example, increasing disinfection, or improving filtration. As a process indicator, a drop in cell null value provided predictive insight into instability in the water system, and together with the trends of other water parameters can provide an early indicator of water instability. Taken together with other water parameters, an important prediction measure would provide an accurate prediction of that bin will the cell null fall into after a certain number of hours. A cell null test model was created to predict the value of cell null in the future from current parameters and to predict whether the system is going to be unstable given system parameters. A correlation matrix of various water parameters is shown in FIG. 16. In particular, features that were found to be correlated with cell null 120 minutes ahead of an adverse event in cell null included the cell null mean window feature, cell null sum of values, reagent pump with a large standard deviation, and cell active Fast Fourier transform, where cell active is the measure of colorimetric transmittance through a water sample with an added reagent. With the present model it has been shown that early detection of cell null instability can reliably provide a reasonable prediction and early warning of a water system instability at least a few hours ahead, at least two hours and up to six hours in advance of an adverse water event. By incorporating this tool into the water control system unnecessary shutdown can be avoided, and money, time, and labor can be saved by mitigating the adverse water event before it gets out of control.

Example 3: Anomaly Detection Using Multiple Water Parameters and Cell Null

Figure 17:
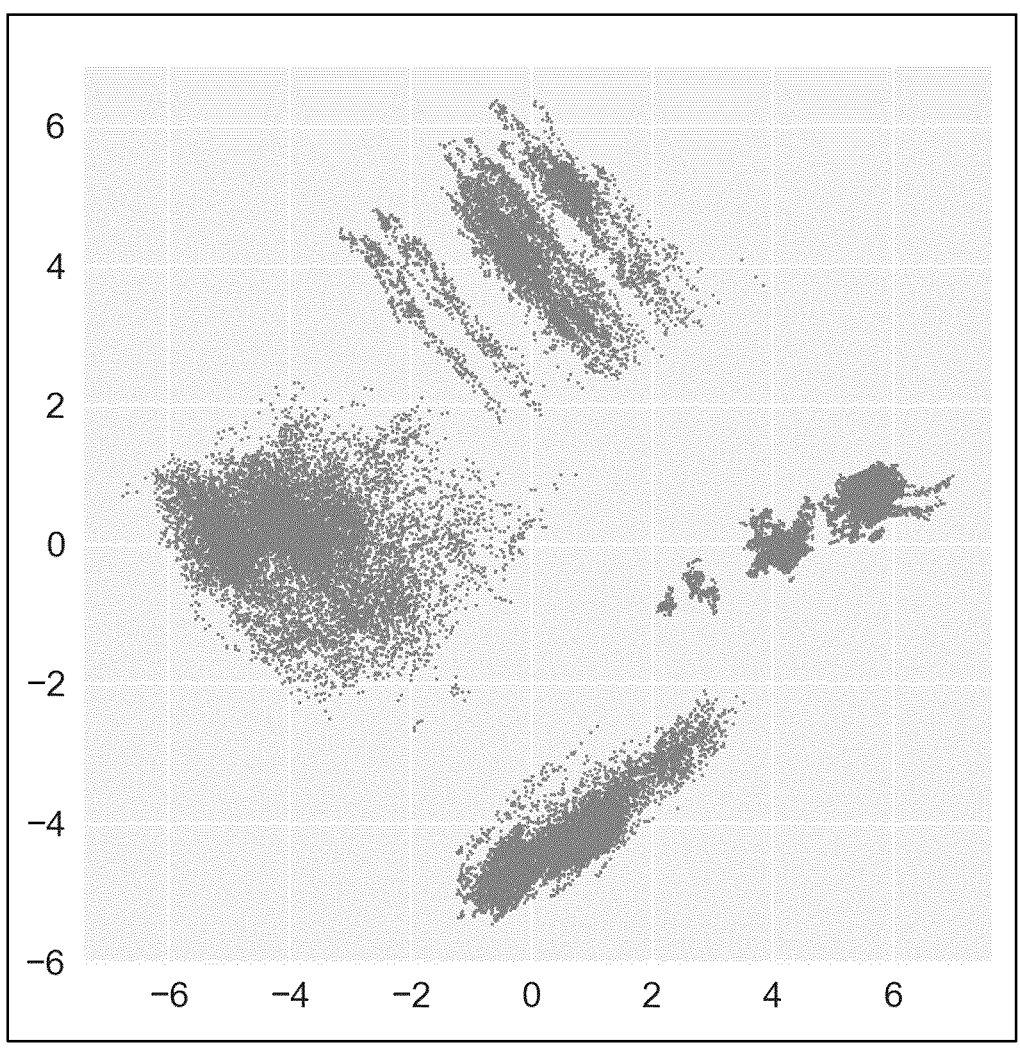
FIG. 17 is a multi-parameter principal component analy- sis model of water system data.
Figure 18:
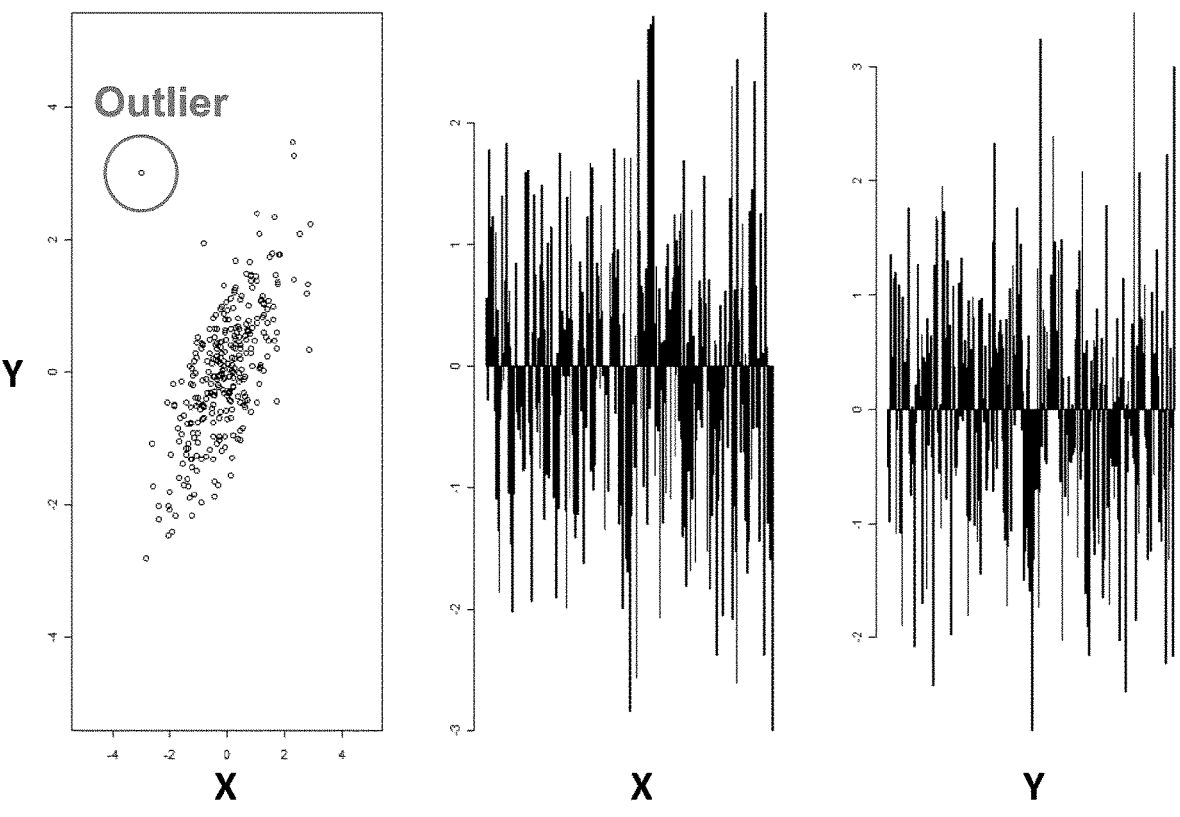
FIG. 18 is an x-y plot of feature data showing a data cluster and outlier.

Using water parameters and cell null trends, a prediction can be made whether the system is unstable in the moment based on the system parameters. In particular, using the cell null value together with other system parameters it can be determined whether the water system at a given point is time is within or outside normal operating parameters. In complex systems there are predefined correlations among different variables. If there is an anomaly in the water system, the anomaly may not show up in any one particular water parameter reading, however the correlations between certain water parameters will be outside of a margin of error and the error measurement can be detected as a sign of instability in the water system. For example, all water parameters may each be within their normal range, however taken together the correlations between parameters may be significantly deviated from a normal in-control water supply, and the degree of deviation in the correlation will be indicative of a potential future loss of water integrity event. Accordingly, an algorithm comprising the correlations between water parameters can be used to measure whether the collection of measured water parameters at any point in time are within normal range or outside of a normal range, where outside of the normal range is indicative of a system anomaly and precursor to an adverse event. Detecting an anomalous system event based on this multi-parameter algorithm including the cell null value can provide significant advanced warning of an adverse event sufficient to adjust the water parameters to mitigate or avoid the adverse event. Data from different sites in different jurisdictions and in different industrial areas can be brought into the algorithm to teach the algorithm FIG. 17 is a multi-parameter principal component analysis model of a water system data. In this multi-dimensional analysis, each of the data points in the figure is a timepoint on the multi-parameter matrix in which the system is operating, and the data clusters are indicative of normal operation of the water system. An anomaly in the water system can be detected using Mahalanobis distance where when the standard deviation away from the mean cluster value exceeds a certain distance the system is identified as being in an unsteady or abnormal state. The Mahalanobis distance is a measure of the distance between a point P and a distribution D and is a multi-dimensional generalization of the idea of measuring how many standard deviations away P is from the mean of D. This distance is zero for P at the mean of D and grows as P moves away from the mean along each principal component axis. The Mahalanobis distance is unitless, scale-invariant, and takes into account the correlations of the data set and is used in the present data to determine whether the system as a whole, given the multiple measured water parameters, is inside the normal range or outside the normal range. FIG. 18 is an x-y plot of feature data showing a data cluster and outlier. An error analysis using Mahalanobis distance in a multi-variable classification provides an indication of whether the water system is prone to an adverse event, which can be mitigated or avoided by early action. The Mahalanobis distance calculation is fully unsupervised and weights each feature differently. Outliers from clusters can be identified as well as quantified based on the distribution of learned non-anomalous data along the number of dimensions in the multi-parameter matrix.

Figure 19A:
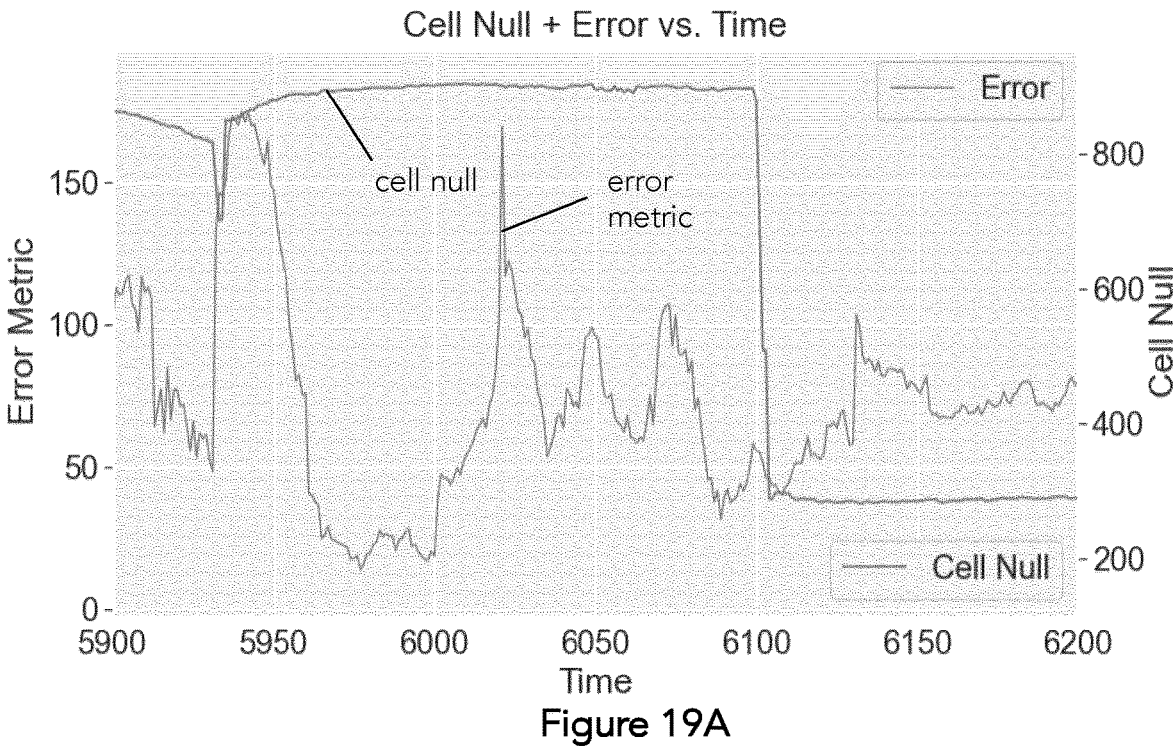
FIG. 19A is a graph of the outlier error metric compared to the measured cell null parameter over time in an unsteady water system.
Figure 19B:
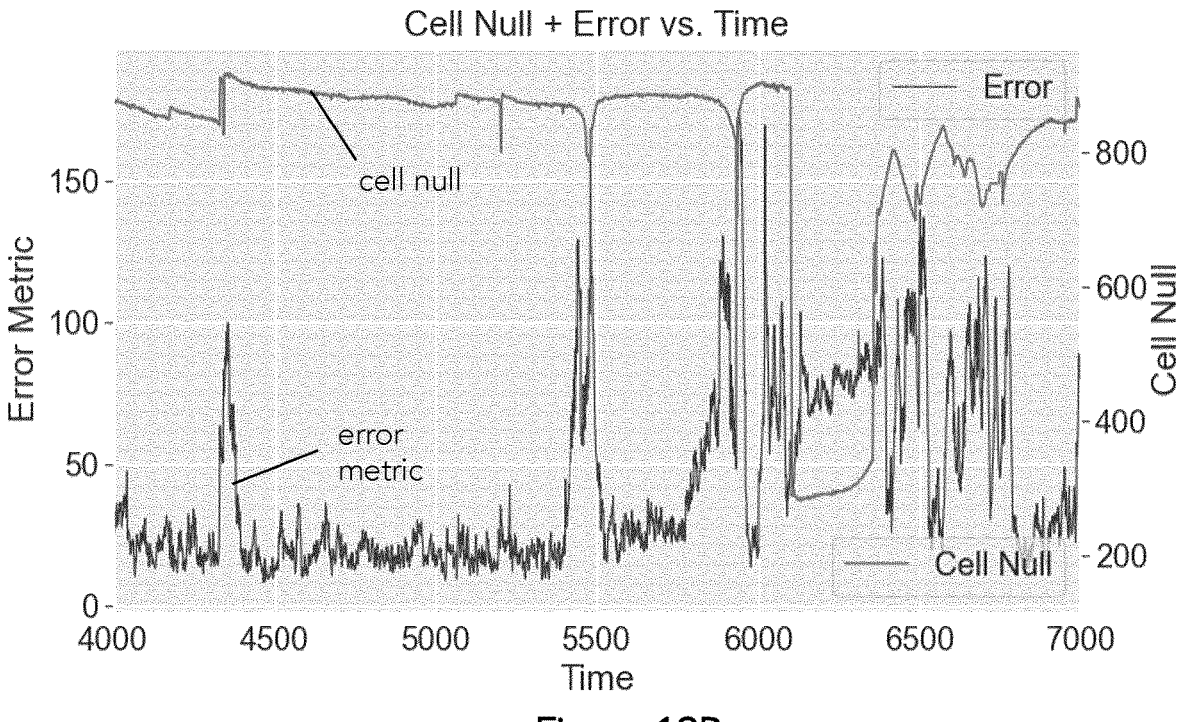
FIG. 19B is a graph of the outlier error metric compared to the measured cell null parameter over a longer time including a stable time period.

FIG. 19A is a graph of the outlier error metric compared to the measured cell null parameter over time in an unsteady water system. FIG. 19B is a graph of the outlier error metric compared to the measured cell null parameter over a longer time including a stable time period. Prior to the graph trace the error output of the Mahalanobis distance from the high integrity water system clusters was low and relatively steady. A threshold standard deviation of 25 was applied to the error trace to demonstrate where a normal, high integrity water system performs along the measured water parameters in the multi-variable matrix. The spiking and high deviation error metric from the threshold is demonstrative of a future significant and precipitous decrease in cell null value, which is indicative of a severe adverse water event. As shown, the warning time on the error metric algorithm at predicting the adverse event is about six hours, which is plenty of time for the system to adjust control parameters such as pH and disinfectant concentration to prevent the adverse event.

The water system example dataset used in this example was able to show six hours earlier that the system was not stable, though the visual data showed a relatively high cell null, and at least two hours beforehand that the cell null would crash. Insights into this type of advanced warning system are a significant improvement over current systems of water integrity control, which largely depend on chemical disinfectant concentration residual measurement, which when the measured disinfectant levels drop significantly below the warning level or well below the setpoint provide the first warning. This often happens within minutes of an adverse event of loss of disinfection control, however this can now be avoided as it has been found that system instability and water quality loss is preceded with clear indications hours before it actually happens. In the present case, with advanced warning the instability situation that occurred would have led to a scramble to remediate the problem by using a shock dose of sanitizer and cleaning out the filters, whereas advances warning would have triggered earlier mitigation and potential avoidance of the event entirely. The complex multi-variable parameters, which water systems invariably have, can thereby be reduced to a simplified representative indicator to reliably predict instability so that instability can be prevented, reversed, or a potable water system can be optimized.

In a case where it is observed that the cell null value and error metric is very stable over time the disinfection setpoint can be decreased as this is an indication of a stable water system. Consistent awareness of the error metric and cell null value in the system can thereby reduce chemical disinfectant requirements as well as energy requirements which save money, resources, reduce downtime, while maintaining integrity in the water system.

Adjustments to the disinfection process can be initiated when the system detects a rise an increasing rate in microbiology in the system. In particular, an increase in disinfectant addition to the system, and optionally specifically at particular locations where the rise in microbiology concentration has been detected, can assist with maintaining disinfection control. Alternatively or additionally, increase in UV or ozone treatment, change in disinfectant levels such as chlorine in all its forms, all peroxide or peracetic acid or other sanitizer levels, pH, pressure, flow, temperature, filtration capacity or cleaning, or additions of filtration promotion chemicals such as flocculent and coagulant.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge. The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for predicting water instability and mitigating loss of water integrity in a water system, the method comprising:
   providing a disinfectant pump comprising a processor for controlling the pump to maintain a disinfection setpoint, the disinfectant pump connected to a chemical disinfectant supply to inject chemical disinfectant into the water system;
   diverting a water sample from the water system to a disinfectant concentration measurement system comprising an in-line colorimeter;
   at the in-line colorimeter, measuring a disinfectant concentration of the chemical disinfectant in the water sample periodically over time to provide a real-time measurement of the fluctuation in disinfectant concentration in the water system;
   in a processor, analysing the fluctuation of the disinfectant concentration over time from the colorimeter to detect an instability trend in the disinfectant concentration over time before a loss of water integrity, the instability trend in the disinfectant concentration over time predictive of a future water instability event; and
   when an instability trend in the disinfectant concentration over time is detected, adjusting a water parameter to mitigate the loss of water integrity in the water system.

2. The method of claim 1, wherein adjusting the water parameter comprises one or more of raising the disinfection setpoint, adjusting pH, increasing filtration, increasing UV treatment, increasing ozone treatment, and addition of filtration promotion chemicals.

3. The method of claim 1, wherein the colorimeter measures the disinfectant concentration of the water sample between every 90 seconds to every 5 minutes.

4. The method of claim 1, further comprising collecting additional water parameter data on one or more water parameters continuously over time, and analysing the additional water parameter data collected using time window analysis and feature extraction to detect instability trends in the water system over time.

5. The method of claim 4, wherein the additional water parameter data comprises one or more of disinfectant demand, pump output, pH, hardness, alkalinity, electrical conductivity, ultraviolet absorption, oxidation reduction potential, color, secondary disinfectant concentration, dissolved oxygen, water level, water temperature, temperature differential between two or more locations, water flow speed, and cATP concentration.

6. The method of claim 4, further comprising using the additional water parameter data in a machine learning multi-parameter model to detect anomalies in the water system that fall outside of normal stable operating parameter clusters in the multi-parameter model.

7. The method of claim 1, wherein the instability trend in disinfectant concentration over time comprises one or more of a change in fluctuation period, average peak to peak distance over a set time period, area under the curve (AUC) calculation relative to the disinfection setpoint, range of measured disinfectant concentration, and overall trend in average concentration.

8. The method of claim 1, further comprising raising an alert when an instability trend in the disinfectant concentration over time is detected.

9. The method of claim 1, wherein the water system is one of a potable water system, agricultural water system, horticultural water system, aquaculture system, and recreational water system.

10. A system for controlling water integrity in a water system, the system comprising:
    a disinfectant pump comprising a processor for controlling the pump to maintain a disinfection setpoint, the disinfectant pump connected to a chemical disinfectant supply to inject chemical disinfectant into the water system;
    a water quality database for receiving and storing water quality parameter data from the water system over time;
    an in-line colorimeter receiving a water sample from the water system and measuring a fluctuation in disinfectant concentration of the chemical disinfectant in the water sample periodically over time; and
    a processor for analysing the fluctuation of the disinfectant concentration over time from the colorimeter to detect an instability trend in the disinfectant concentration over time before a loss of water integrity, the instability trend in the disinfectant concentration over time predictive of a future water instability event, and providing a prescriptive remedy based on the instability trend and water quality parameter data for reversing the instability trend comprising adjusting a water parameter to mitigate the loss of water integrity event.

11. The system of claim 10, wherein the colorimeter measures the disinfectant concentration in the water sample between every 90 seconds to every 5 minutes.

12. The system of claim 10, wherein the prescriptive remedy comprises one or more of raising the disinfection setpoint, adjusting pH, increasing filtration, increasing UV treatment, increasing ozone treatment, and addition of filtration promotion chemicals.

13. The system of claim 10, wherein the water quality database comprises additional water parameter data comprising one or more of disinfectant demand, pump output, pH, hardness, alkalinity, electrical conductivity, ultraviolet absorption, oxidation reduction potential, color, secondary disinfectant concentration, dissolved oxygen, water level, water temperature, temperature differential between two or more locations, water flow speed, and cATP concentration.

14. The system of claim 13, wherein the processor uses the additional water parameter data in a machine learning multi-parameter model to detect anomalies in the water system that fall outside of normal stable operating parameter clusters in the multi-parameter model.

15. The system of claim 10, wherein the water system is one of a potable water system, agricultural water system, horticultural water system, aquaculture system, and recreational water system.

16. The system of claim 10, further comprising an alarm to provide an early warning alert to the instability trend indicating future loss of water integrity.

17. The system of claim 10, wherein the processor performs one or more of statistical process control analysis, principal component analysis, and multi-parameter machine learning.

18. The method of claim 1, wherein the chemical disinfectant is hydrogen peroxide, chlorine, or chloramine.

19. The system of claim 10, wherein the chemical disinfectant is hydrogen peroxide, chlorine, or chloramine.

\* \* \* \* \*